(12) United States Patent
Kadota

(10) Patent No.: US 6,962,550 B2
(45) Date of Patent: Nov. 8, 2005

(54) CONTROL FOR VEHICLE INCLUDING ELECTRIC MOTOR POWERED BY ENGINE DRIVEN GENERATOR

(75) Inventor: Keiji Kadota, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/280,131

(22) Filed: Oct. 25, 2002

(65) Prior Publication Data

US 2003/0089539 A1 May 15, 2003

(30) Foreign Application Priority Data

Oct. 26, 2001 (JP) .................................. 2001-329887

(51) Int. Cl.⁷ .................. H02P 15/00; H02P 15/02; B60K 6/00; B60K 1/00; G06F 7/00
(52) U.S. Cl. .................. 477/15; 477/6; 477/8; 701/22; 701/53; 701/58; 180/65.2; 180/65.3; 180/65.4
(58) Field of Search .................. 477/8, 6, 15, 16, 477/13; 701/22, 67, 68, 69, 53, 51, 58, 59; 180/65.2, 65.3, 65.4

(56) References Cited

U.S. PATENT DOCUMENTS

| | | | |
|---|---|---|---|
| 4,319,140 A | | 3/1982 | Paschke |
| 4,923,025 A | | 5/1990 | Ellers |
| 4,976,328 A | * | 12/1990 | Ohmura ...................... 180/412 |
| 5,346,031 A | | 9/1994 | Gardner |
| 5,586,613 A | | 12/1996 | Ehsani |
| 5,788,005 A | * | 8/1998 | Arai ........................... 180/65.2 |
| 6,008,606 A | | 12/1999 | Arai et al. |
| 6,059,064 A | | 5/2000 | Nagano et al. |
| 6,205,379 B1 | * | 3/2001 | Morisawa et al. ............ 701/22 |
| 6,434,469 B1 | | 8/2002 | Shimizu et al. |
| 6,435,296 B1 | * | 8/2002 | Arai ........................... 180/243 |
| 6,524,217 B1 | * | 2/2003 | Murakami et al. ............. 477/5 |
| 6,528,959 B2 | * | 3/2003 | Kitano et al. ................. 318/55 |
| 6,704,627 B2 | * | 3/2004 | Tatara et al. ................. 701/22 |
| 6,767,310 B2 | * | 7/2004 | Amanuma et al. .......... 477/174 |
| 2002/0192284 A1 | * | 12/2002 | Moroni et al. |

FOREIGN PATENT DOCUMENTS

| | | | | |
|---|---|---|---|---|
| EP | 1094960 | | 5/2001 | |
| EP | 1177931 A2 | * | 2/2002 | ........... B60K/41/00 |
| JP | 55-110328 U | | 8/1980 | |
| JP | 59-176119 A | | 10/1984 | |
| JP | 7-231508 A | | 8/1995 | |
| JP | 8-300965 A | | 11/1996 | |
| JP | 2000179678 A | * | 6/2000 | ........... F16H/61/14 |
| JP | 2000-318473 A | | 11/2000 | |
| JP | 2002-171607 A | | 6/2002 | |

OTHER PUBLICATIONS

U.S. Appl. No. 10/237,968, filed Sep. 10, 2002, Saeki et al.
Service Manual, "Nissan March", issued Feb. 2002.
Service Manual, "Nissan March", issued Sep. 2002.

* cited by examiner

Primary Examiner—Tisha Lewis
(74) Attorney, Agent, or Firm—Foley & Lardner LLP

(57) ABSTRACT

A control system for a vehicle is disclosed. The vehicle has a first powertrain and a second powertrain. The first powertrain includes an engine and it is coupled with a first set of road wheels. The second powertrain includes an electric motor and it is coupled with a second set of road wheels. A generator is coupled with the engine. The generator is provided as a source of electric power for the electric motor. The control system comprises control logic for determining whether or not there is a need for a predetermined scheme, which is planned to prevent the motor from applying running resistance to the second set of road wheels. The control system also comprises control logic for executing the predetermined scheme in response to the need.

14 Claims, 18 Drawing Sheets

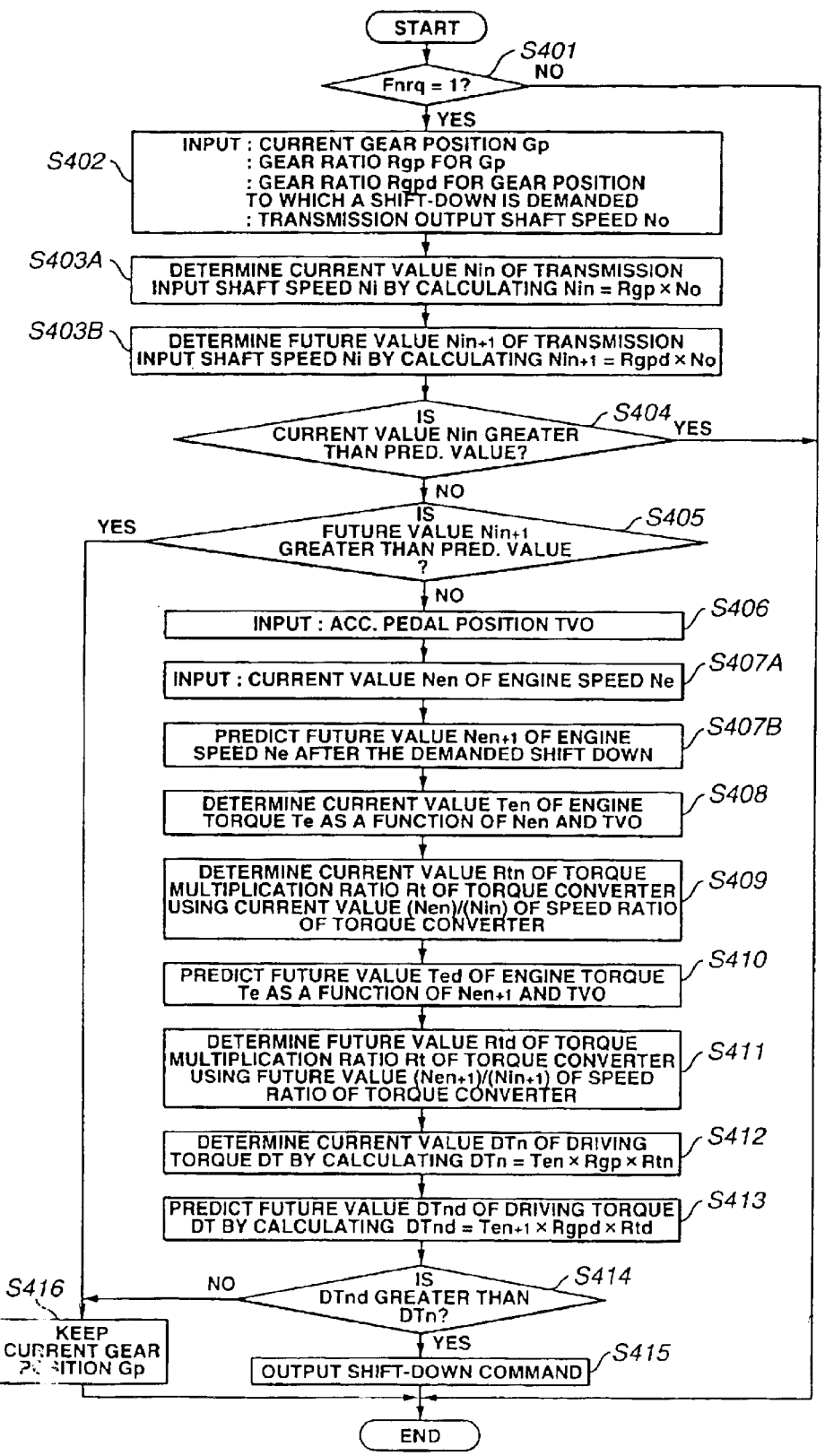

CONTROL FOR VEHICLE INCLUDING ELECTRIC MOTOR POWERED BY ENGINE DRIVEN GENERATOR

BACKGROUND OF THE INVENTION

1. Field of the Invention

The present invention relates to a control system and method for a vehicle with a first powertrain including an engine and a second powertrain including an electric motor powered by an engine driven generator.

2. Description of the Background Art

Vehicles are proposed, which have a first powertrain including an engine and an automatic transmission, and a second powertrain including an electric motor powered by a generator driven by the engine. The first powertrain is coupled with a first set of road wheels. The second powertrain is coupled with a second set of road wheels. Several examples of such vehicles are available.

One such example is disclosed in Japanese Utility Model Application Pre-Grant Publication No. S55-110328, published Aug. 2, 1980. In this example, an internal combustion engine is coupled with a set of front road wheels via a transmission and a front differential gear to define a first powertrain. An electric motor is constantly coupled with a set of rear road wheels via a rear differential gear to define a second powertrain. The motor is energized to produce torque only when electric power is supplied from a generator driven by the engine. A controller is provided to regulate field current passing through the generator. The controller includes a differential amplifier. The differential amplifier receives first and second input voltage signals. The first voltage signal is indicative of wheel speed of the front road wheels. The second voltage signal is indicative of wheel speed of the rear road wheels. The differential amplifier has its output connected with a base of a transistor. The transistor has its collector connected with one terminal of field winding of the generator. The other terminal of the field winding is connected via a mode switch with a battery. In operation, whenever the front road wheels slip, the wheel speed of the front road wheels exceeds the wheel speed of the rear road wheels. This causes the differential amplifier to output a voltage signal, rendering the transistor conductive, allowing field current to pass through the field winding of the generator. The field current and revolution speed determine the voltage of electric power produced by the generator and supplied to the electric motor, causing the electric motor to produce torque. In this manner, whenever the front road wheels slip, the electric motor produces torque to drive the rear road wheels.

Another example is disclosed in Japanese Patent Application Pre-Grant Publication No. H07-231508, published Aug. 29, 1995. In this example, too, an internal combustion engine is coupled with a set of front road wheels via a transmission and a front differential gear to define a first powertrain. An electric motor is coupled with a set of rear road wheels via a rear differential gear to define a second powertrain. Unlike the first mentioned example, a clutch is provided in the second powertrain to interrupt connection between the electric motor and the set of rear road wheels. The provision of such clutch aims at protection of the electric motor. A generator is coupled with the engine to provide electric power to the electric motor. A microprocessor-based controller is provided. The controller determines whether or not current operating conditions correspond to predetermined operating conditions suitable for the electric motor to drive the rear road wheels. The controller receives information as to accelerator pedal position, front wheel speed and rear wheel speed. The controller determines an appropriate value of standard wheel speed for the current value of accelerator pedal position by looking into a look-up table. The look-up table contains various values of standard wheel speed indexed by different values of accelerator pedal position. The controller includes a comparator where the standard wheel speed is compared to the front wheel speed and also to the rear wheel speed. The comparator provides a deviation of the front wheel speed from the standard wheel speed, a deviation of the rear wheel speed from the standard wheel speed, and a deviation of the front wheel speed from the rear wheel speed. Each of these deviations is compared to a threshold to provide one of three different criteria, positive, zero and negative. These criteria constitute elements of a comparison data. The controller determines whether or not the comparison data correspond to any one of predetermined data that justify the electric motor operation to drive the rear road wheels. In this example, there is no description on when and how the controller generates command for engagement or disengagement of the clutch.

Still another example is disclosed in Japanese Patent Application Pre-Grant Publication No. P2000-318473A, published Nov. 21, 2000. In this example, too, an internal combustion engine is coupled with a set of front road wheels via a transmission and a front differential gear to define a first powertrain. An electric motor is coupled with a set of rear road wheels via a rear differential gear to define a second powertrain. A dog clutch is provided in the second powertrain to interrupt connection between the electric motor and the set of rear road wheels. The provision of such clutch aims at protection of the electric motor. A generator is coupled with the engine to provide electric power to the electric motor. A microprocessor-based controller is provided. The controller conducts a start-assist control mode when, with a brake pedal released and a manual select lever placed in a forward drive position, there is a slip between front and rear road wheels at vehicle speeds lower than a predetermined speed value. In this control mode, the controller generates a clutch engagement command, causing a solenoid to engage the dog clutch. The dog clutch remains engaged until the vehicle speed exceeds the predetermined speed value. To protect the motor, the controller generates a clutch disengagement command when the vehicle speed exceeds the predetermined speed value. The controller regulates field current passing through the engine driven generator to cause the motor to vary its output torque in such a manner as to reduce the slip.

Other example is disclosed in Japanese Patent Application Pre-Grant Publication No. P2002-171607A, published Jun. 14, 2002. In this example, too, an internal combustion engine is coupled with a set of front road wheels via a transmission and a front differential gear to define a first powertrain. An electric motor is coupled with a set of rear road wheels via a rear differential gear to define a second powertrain. An electromagnetic clutch is provided in the second powertrain to interrupt connection between the electric motor and the set of rear road wheels. The provision of such clutch aims at protection of the electric motor. Unlike the above-mentioned examples, a battery provides electric power to the electric motor and also to the electromagnetic clutch. A microprocessor-based controller is provided. In order to suppress vibrations of the electric motor, the controller conducts a feedback control by regulating the electric motor to reduce a deviation of a current value of motor speed and a desired value thereof toward zero. The desired value is determined based on the result from calculating a desired value of driving force. The desired value of driving force is determined as a function of accelerator pedal position and vehicle speed.

The prior art control systems are to supply an electric motor with electric power from an engine driven generator when an acceleration slip occurs between the first and second sets of road wheels. Supply of electric power causes the motor to produce torque, applying driving force in opposed relationship to road load from the second set of road wheels. If torque output of the motor fails to achieve a satisfactory level, the motor may apply running resistance to the second set of road wheels. Sufficiently high efficiency and excellent fuel economy cannot be achieved if occurrence of such running resistance is allowed.

Apparently, the inventors of the prior art proposed systems fail to address themselves to a task of solving the above-mentioned problem.

Commonly Owned U.S. Pat. No. 6,434,469 B1 (Date of Patent: Aug. 13, 2002), which has been hereby incorporated by reference in its entirety, discloses a control system for a vehicle with a first powertrain and a second powertrain. The first powertrain includes an engine and it is coupled with a first set of road wheels. The second powertrain includes an electric motor and it is coupled with a second set of road wheels. The vehicle includes a generator coupled with the engine, the generator being provided as a source of electric power for the electric motor. This previously proposed control system provides enhanced acceleration performance by adjusting load torque of the generator to acceleration slip between the first and second sets of road wheels.

Commonly Owned Co-pending U.S. patent application Ser. No. 10/237,968, which has been hereby incorporated by reference in its entirety, was filed on Sep. 9, 2002 in the name of Hideyuki SAEKI et al. for the invention entitled "VEHICLE WITH CLUTCH FOR TRANSMISSION OF TORQUE OUTPUT OF MOTOR". This Co-pending Application claims priority on Japanese Patent Application No. 2001-274123 (Filing Date: Sep. 10, 2001) and Japanese Patent Application No. 2001-367541 (Filing Date: Nov. 30, 2001). This incorporated Co-pending U.S. application discloses a control system for a vehicle with a first powertrain and a second powertrain. The first powertrain includes an engine and it is coupled with a first set of road wheels. The second powertrain includes an electric motor and it is coupled with a second set of road wheels. The vehicle includes a generator coupled with the engine, the generator being provided as a source of electric power for the electric motor. The second powertrain includes a hydraulic or wet clutch for transmission of torque output of the electric motor to the second set of road wheels and transmission of road load from the road wheels to the electric motor. According to this control system, the hydraulic clutch is disengaged when a current vehicle speed exceeds a threshold and the threshold is altered. Accounting for clutch drag state of the hydraulic clutch, the control system alters the threshold.

The previously proposed control systems and methods are satisfactory to some extent. However, a need remains for improving the proposed control systems and methods so as to achieve enhanced efficiency and fuel economy by solving the problem that the electric motor may apply running resistance to the second set of road wheels if torque output of the motor drops.

Accordingly, an object of the present invention is to provide control system and method that have achieved enhanced efficiency and fuel economy by solving the problem that the electric motor may apply running resistance to the second set of road wheels if torque output of the motor drops.

SUMMARY OF THE INVENTION

In one exemplary implementation of the present invention, a control system for a vehicle is provided. The vehicle has a first powertrain and a second powertrain. The first powertrain includes an engine and it is coupled with a first set of road wheels. The second powertrain includes an electric motor and it is coupled with a second set of road wheels. A generator is coupled with the engine. The generator is provided as a source of electric power for the electric motor. The control system comprises control logic for determining whether or not there is a need for a predetermined scheme, which is planned to prevent the motor from applying running resistance to the second set of road wheels. The control system also comprises control logic for executing the predetermined scheme in response to the need.

In another exemplary implementation of the present invention, a control method for a vehicle is provided. The vehicle has a first powertrain and a second powertrain. The first powertrain includes an engine and it is coupled with a first set of road wheels. The second powertrain includes an electric motor and it is coupled with a second set of road wheels. A generator is coupled with the engine. The generator is provided as a source of electric power for the electric motor. The control method comprises determining whether or not there is a need for a predetermined scheme, which is planned to prevent the motor from applying running resistance to the second set of road wheels. The control method also comprises executing the predetermined scheme in response to the need.

BRIEF DESCRIPTION OF THE DRAWINGS

The invention will be apparent from reading of the following description in conjunction with the accompanying drawings.

FIG. 11 is a flow diagram illustrating a control routine of software implementation of control logic for executing another predetermined scheme for preventing an electric motor from applying running resistance to a set of rear road wheels.

DETAILED DESCRIPTION OF THE INVENTION

Figure 1:
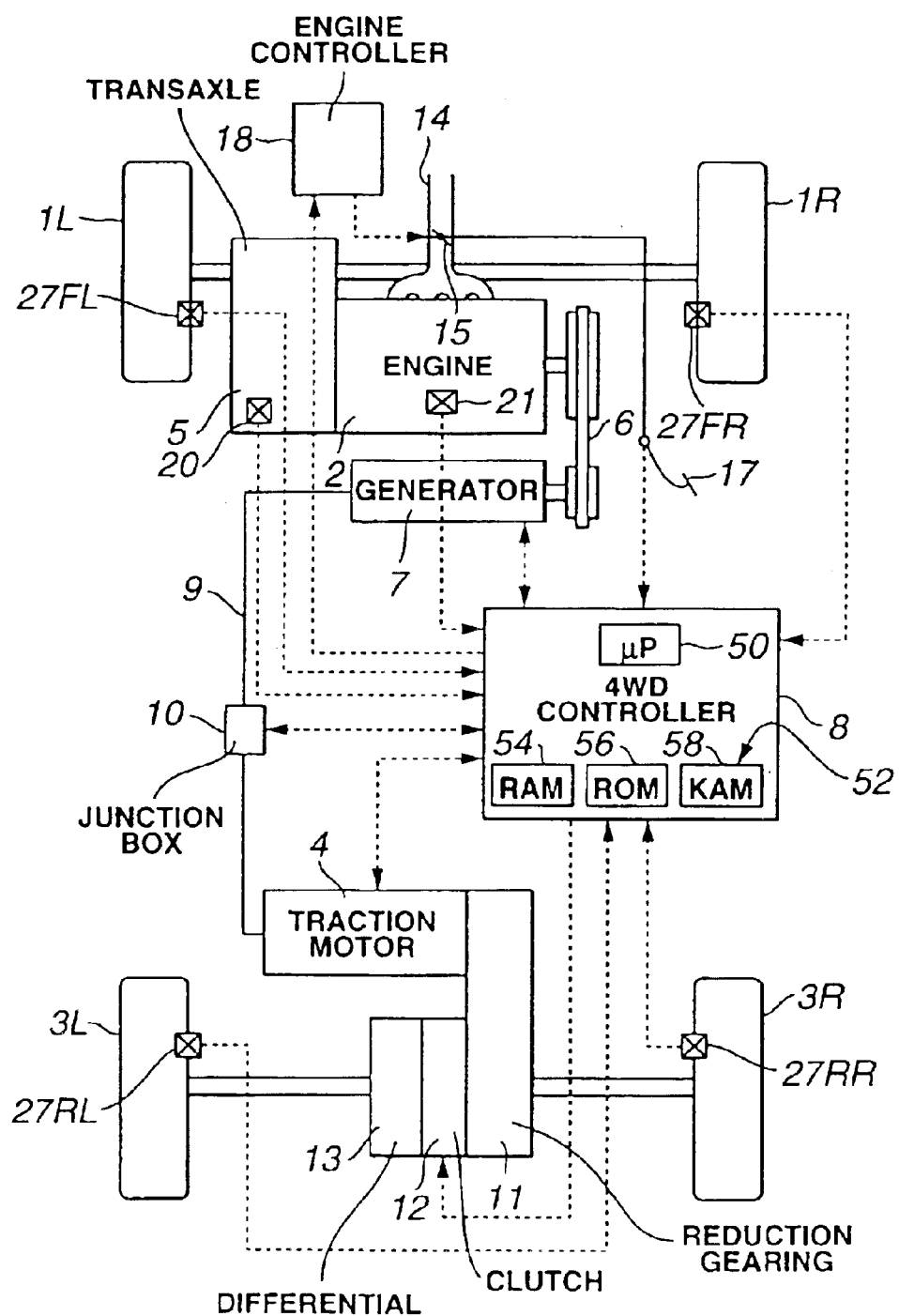
FIG. 1 is a simplified view of a vehicle incorporating the present invention.

Referring now to the accompanying drawings, FIG. 1 shows a vehicle incorporating the present invention. The vehicle has a first powertrain and a second powertrain. The first powertrain includes a prime mover in the form of an internal combustion engine 2. The first powertrain is drivingly coupled with a first set of road wheels 1L and 1R. The second powertrain includes an electric motor 4 and it is drivingly coupled with a second set of road wheels 3L and 3R.

The first powertrain includes a torque converter, an automatic transmission, and a differential. The torque converter includes a pump impeller, a stator and a turbine runner. The pump impeller is coupled with a crankshaft of the engine 2 for rotation therewith. The turbine runner is coupled with an input shaft of the automatic transmission. An output shaft of the automatic transmission is coupled with the differential. The automatic transmission has various speed ratios of the input shaft to the output shaft. The differential is disposed between the first set of road wheels 1L and 1R. In the illustrated embodiment, an automatic transaxle 5 of the RE4F03B type is used, which includes a torque converter, a four-speed automatic transmission and a differential. For further information on the automatic transaxle of the RE4F03B type, reference is made to pages C-6 to C-22 in service manual "Nissan MARCH" issued February 2002 by Nissan Motor Co., Limited. The present invention is operational with any other type of automatic transmission having various speed ratios, including continuously variable transmissions (CVTs) and discretely variable transmissions.

The second powertrain includes a reduction gearing 11 coupled with the electric motor 4, a differential 13 and an electromagnetic clutch 12. The present invention is operational with any other type of clutch, including electromagnetic and is hydraulic clutches. The differential 13 is disposed between the second set of road wheels 3L and 3R. The clutch 12 is provided for transmission of torque output of the motor 4 to the second set of road wheels 3L and 3R and for transmission of road load from the road wheels 3L and 3R to the motor 4. In the illustrated embodiment, an integral drive unit including a reduction gearing, an electromagnetic clutch and a differential is used. For further information on this integral drive unit, reference is made to page C-10 in service manual "Nissan MARCH" issued September 2002 by Nissan Motor Co., Limited.

In the illustrated embodiment, the road wheels of the first set are a front left road wheel 1L and a front right road wheel 1R, respectively, and the road wheels of the second set are a rear left road wheel 3L and a rear right road wheel 3R, respectively. The present invention is not limited to this example. The road wheels of the first set may be a rear left road wheel and a rear right road wheel, respectively, and the road wheels of the second set may be a front left road wheel and a front right road wheel. As will be explained below, the vehicle operates in 4WD mode when engagement of the clutch 12 transmits torque output of the motor 4 to the second set of road wheels 3L and 3R.

The engine 2 is coupled with the automatic transaxle 5. In operation, the automatic transaxle 5 transfers the engine torque Te to the first set of road wheels 1L and 1R. An endless belt 6 interconnects a pulley of engine 2 and a pulley of a generator 7, causing the generator 7 to rotate at a revolution speed Nh that is expressed as the product of a pulley ratio Rp between the pulleys and the engine speed Ne. With no field current Ifh passing through it, the generator 7 produces no electric power. With field current Ifh, the generator 7 produces electric power.

Figure 2:
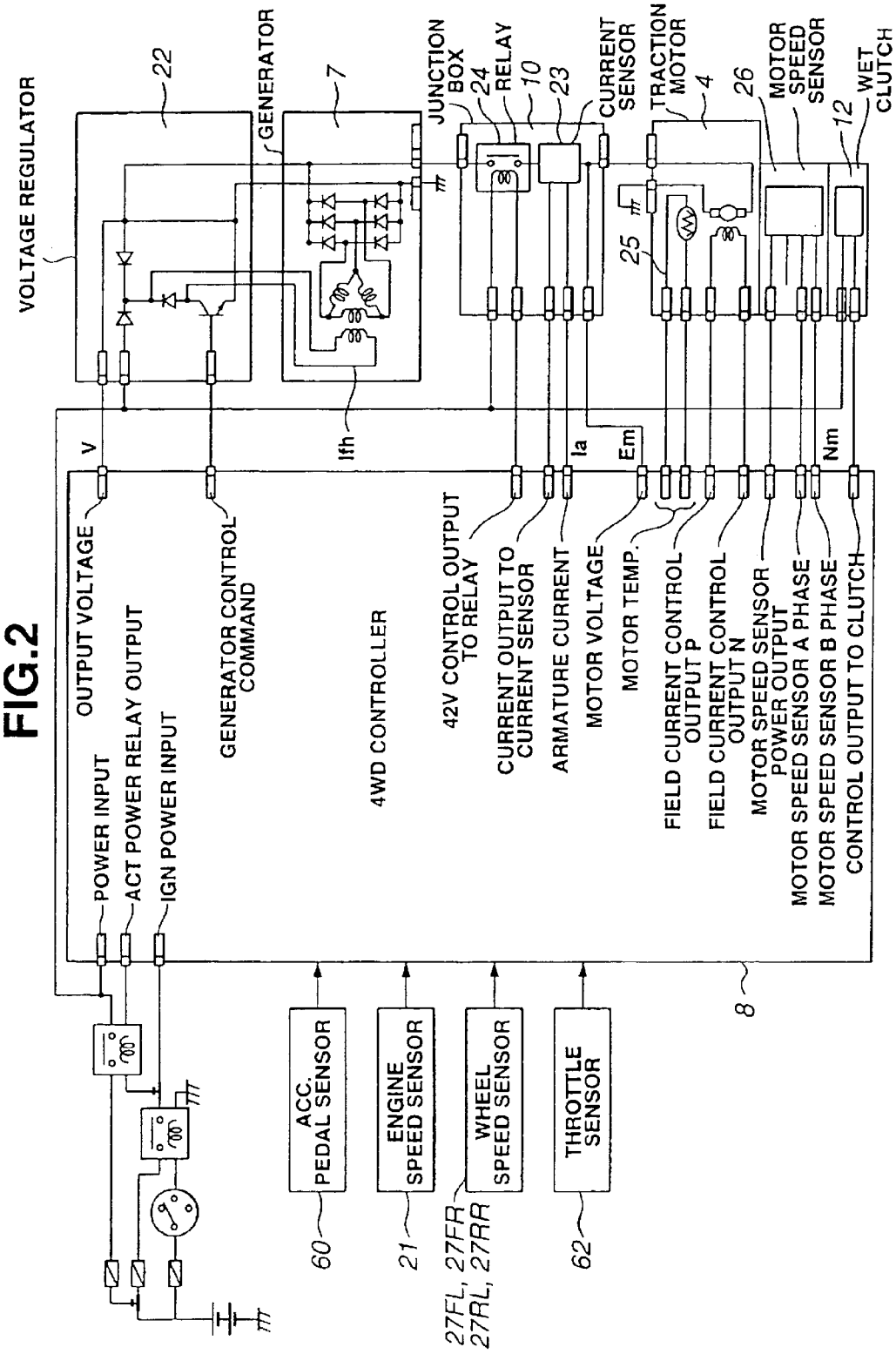
FIG. 2 is a hardware drawing showing the relationship between a 4WD controller and the associated devices.

With reference also to FIG. 2, a microprocessor based 4WD controller 8 regulates field current Ifh passing through the generator 7. The field current Ifh determines load torque, which is applied to the engine 2 when the generator produces electric power. The load torque, in turn, determines voltage of the electric power output of generator 7. Thus the 4WD controller 8 can regulate the electric power output by regulating field current Ifh.

Via a cable 9, the electric power output of generator 7 is selectively supplied to motor 4. A junction box 10 is positioned in cable 9 between generator 7 and motor 4.

The 4WD controller 8 includes a microprocessor 50 in communication with computer-readable storage medium 52. As will be appreciated by those skilled in the art, the computer-readable storage medium 52, for example, may include a random access memory (RAM) 54, a read-only memory (ROM) 56, and/or a keep-alive memory (KAM) 58.

The engine 2 has an air intake system 14, in which a throttle valve 15 is mounted. In response to the depressed position of an accelerator pedal 17, the opening angle of throttle valve 15 is controllably adjusted. In one embodiment, a mechanical linkage interconnects throttle valve 15 and accelerator pedal 17. In another embodiment, an engine controller 18 receives information as to the depressed angle of accelerator pedal 17 by monitoring an accelerator pedal sensor 60 (see FIG. 2) and controllably adjusts the opening angle of throttle valve 15. The output of accelerator pedal sensor 60 is fed to 4WD controller 8.

An engine speed sensor 21 generates a signal indicative of the engine speed Ne of engine 2. A transmission output shaft speed sensor 20 generates a signal indicative of the transmission output shaft speed. A throttle sensor 62 (see FIG. 2) is also provided. The outputs of these sensors are fed to 4WD controller 8.

With continuing reference to FIG. 2, generator 7 is provided with a voltage regulator 22. Voltage regulator 22 regulates voltage V of electric power output of generator 7. Regulating field current Ifh by 4WD controller 8 allows adjustment of load torque Th applied to engine 2 by generator 7 for generation of electric power and hence voltage V of the electric power. Voltage regulator 22 receives a generator control command from 4WD controller 8. The generator control command is indicative of a command value of field current Ifh determined at 4WD controller 8. Voltage regulator 22 detects voltage V of electric power output of generator 7 and feeds it to 4WD controller 8. As mentioned before, speed Nh of generator 7 can be calculated based on the pulley ratio Rp and the engine speed Ne.

Junction box 10 includes a current sensor 23 and a relay 24. Current sensor 23 is provided to measure electric current of electric power supplied to armature of motor 4 and feeds an armature current Ia indicative signal to 4WD controller 8. Junction box 10 also includes a measuring point connected to motor 4 to measure terminal voltage thereof. 4WD controller 8 has an input port connected to this measuring point and receives the terminal voltage as a motor voltage E. 4WD controller 8 generates a relay command upon determination that supply of electric power to motor 4 be interrupted to deactivate it. In response to the relay command, 4WD controller 8 applies a 42V control output to relay 24, causing the relay to interrupt supply of electric power to motor 4.

4WD controller 8 has four ports connected to motor 4. Among them, two ports are provided for field current control output P and field current control output N, respectively. Via these two ports, 4WD controller 8 regulates field current Ifm passing through motor 4 to adjust torque output Tm of motor 4. The other two ports are provided for receiving motor temperature and connected to a temperature sensor of motor 4, in the form of a thermistor 25. Thermistor 25 is provided to measure brush temperature of motor 4.

4WD controller 8 is connected to a motor speed sensor 26. Motor speed sensor 26 is provided to measure a motor speed Nm, i.e., a revolution speed of motor 4. 4WD controller 8 receives information as to motor speed Nm from the output of the motor speed sensor 26.

4WD controller 8 is connected to clutch 12. 4WD controller 8 has a port (control output to clutch) for a clutch command. The clutch command includes clutch disengagement or engagement command. In response to the clutch engagement command from 4WD controller 8, clutch 12 engages to transmit torque output of motor 4 to road wheels 3L and 3R and to transmit road load from the road wheels 3L and 3R to motor 4. In response to the clutch disengagement command, clutch 12 disengages to interrupt connection between motor 4 and road wheels 3L and 3R.

The 4WD controller 8 is connected to wheel seed sensors 27FL, 27FR, 27RL, and 27RR, which are provided to road wheels 1L, 1R, 3L, and 3R, respectively.

Figure 3:
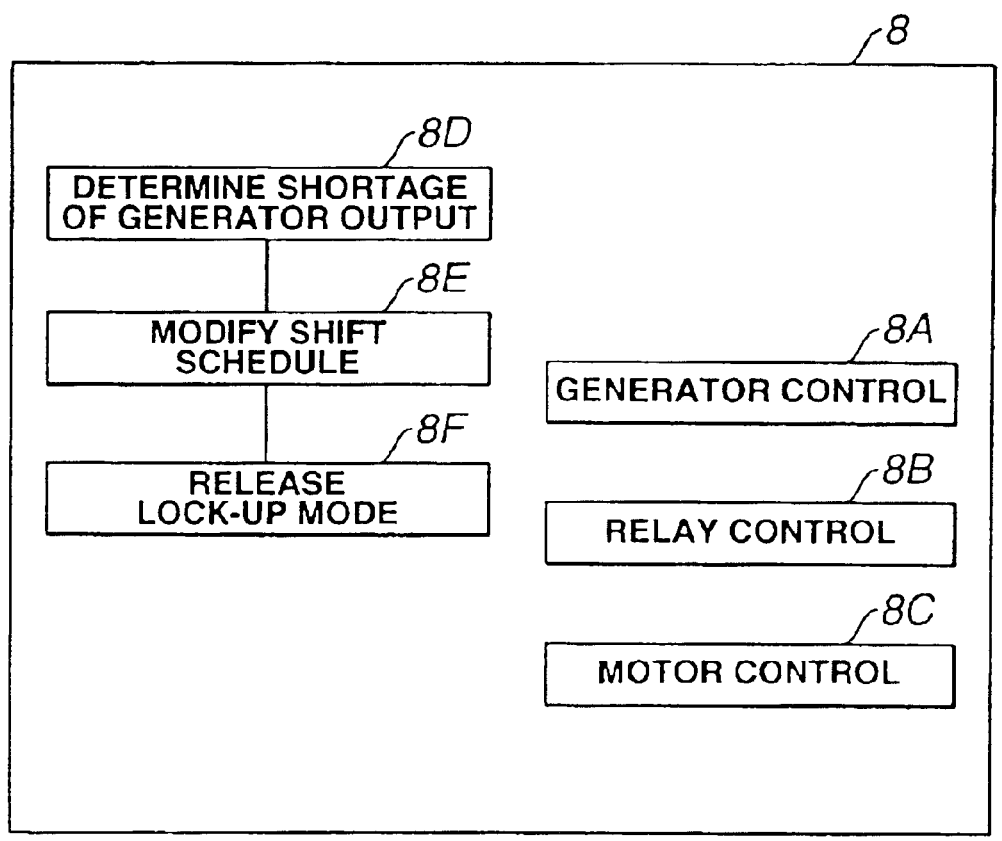
FIG. 3 is a block diagram illustrating one example of control within the 4WD controller.

With reference now to FIG. 3, 4WD controller 8 includes a generator controller block 8A, a relay controller block 8B, and a motor controller block 8C. 4WD controller 8 includes control logic 8D, control logic 8E and control logic 8F. At control logic 8D, controller 8 determines that there is a need for a predetermined scheme, which is planned to prevent motor 4 from applying running resistance to road wheels 3L and 3R when shortage of generator output is determined. If this is the case, the predetermined scheme is executed. In one embodiment, the predetermined scheme is to modify a shift schedule in the automatic transmission such that the modified shift schedule provides expanded operating range of greater speed (or gear) ratios by compressing operating range of smaller speed (or gear) ratios. For example, replacing an ordinary shift schedule map with another shift schedule map having shift-up point(s) on higher vehicle speed sides is one option to realize this modification. In addition to this modification in shift schedule, the predetermined schedule may include a release of a lock-up clutch within the torque converter. Specifically, at control logic 8E, controller 8 replace the ordinary shift schedule map with another shift schedule map to modify shift schedule, and, at control logic 8F, it releases lock-up mode in the torque converter. Such controlling of the transaxle 5 affects engine speed Ne and hence generator speed Nh in such a manner for generator 7 as to produce electric power high enough for motor 4 to output torque that overcomes road load from road wheels 3L and 3R.

At generator controller block 8A, controller 8 monitors voltage regulator 22 to input voltage V of electric power output of generator 7 and regulates field current Ifh of generator 7 to adjust the current value of voltage V to a desired value.

At relay controller block 8B, controller 8 controls relay 24 to activate motor 4 by allowing supply of electric power output of generator 7 to motor 4 or to deactivate motor 4 by interrupting supply of electric power to motor 4.

At motor controller block 8C, controller 8 regulates field current Ifm passing through motor 4 to adjust the current value of torque output of motor 4 to a desired value.

Throughout the specification, the following notations are used in describing measured or calculated or predicted variables.

| | |
|---|---|
| Ne: | Engine speed; |
| Ni: | Speed of transmission input shaft; |
| No: | Speed of transmission output shaft; |
| Nh: | Generator speed; |
| Nm: | Motor speed; |
| VWfl: | Wheel speed of front left road wheel 1L; |
| VWfr: | Wheel speed of front right road wheel 1R; |
| VWrl: | Wheel speed of rear left road wheel 3L; |
| VWrr: | Wheel speed of rear right road wheel 3R; |
| VWf: | The average front wheel speed of VWfl and VWfr; |
| VWr: | The average rear wheel speed of VWrl and VWrr; |
| ΔVF: | Slip speed or acceleration slip; |
| Tm; | Motor torque of motor 4; |
| TM: | Desired value of motor torque Tm (or desired motor torque); |
| Rp: | Pulley ratio between a pulley on engine 2 and a pulley on generator 7; |
| Phmax: | The maximum output of generator 7; |
| Rhom: | The efficiency of motor 4; |
| TMmax: | The maximum torque of motor 4 that indicates capability limit of motor 4 under current operating condition of generator 7; |
| Fnrq: | Flag that is set when there is a need for a predetermined scheme, which is planned to prevent motor 4 from applying running resistance to road wheels 3L and 3R; |
| Em: | Induced voltage of motor 4; |
| Ifm: | Field current of motor 4; |
| Ia: | Armature current of generator 7, which armature current is indicative of armature current of motor 4 upon supply of electric power from generator 7; |
| Ifh: | Field current of generator 7; |
| V: | Desired value of output voltage of generator 7; |
| Gp: | Current gear position of automatic transmission; |
| Rgp: | Gear ratio (= speed ratio of speed Ni of transmission input shaft to speed No of transmission output shaft) of current gear position Gp; |
| Rgpd: | Gear ratio of future gear position after shift-down; |
| Nin: | Current value of transmission input shaft speed Ni; |
| Nin + 1: | Future value of transmission input shaft speed Ni after shift-down; |
| TVO: | Accelerator pedal position; |
| Nen: | Current value of engine speed Na; |
| Nen + 1: | Future value of engine speed Ne after shift-down; |
| Ta: | Torque of engine 2; |
| Ten: | Current value of engine torque Te; |
| Ted: | Future value of engine torque Te after shift-down; |
| Rt: | Torque multiplication ratio of torque converter; |
| Rtn: | Current value of torque multiplication ratio Rt; |
| Rtd: | Future value of torque multiplication ratio Rt after shift-down; |
| DT: | Driving torque; |
| DTn; | Current value of driving torque DT; |
| DTnd: | Future value of driving torque DT after shift-down; |
| Th: | Desired value of load torque applied to engine 2 by generator 7 for generation of electric power; |
| TG: | Current value of load torque applied to engine 2 by generator 7 for generation of electric power; |
| Tif: | Acceleration torque by first powertrain; |
| Ff: | Road reaction at front road wheels 1L and 1R; |
| Rhm: | Generator-to-motor (GTM) ratio $\left(=\frac{Nh}{Nm}\right)$. |
| DTVO: | Rate of change in accelerator pedal position (or the first derivative of accelerator pedal position TVO); |
| STVO: | Future value of accelerator pedal position a predetermined period of time after; |
| SOUTRPM: | Future value of transmission output shaft speed a predetermined period of time after. |

$$TM\max = Rhom \times \frac{Ph\max}{Nm} \quad \text{Eq. 1}$$

The desired value TM of motor torque is expressed as:

$$TM = \Delta VF \times K \quad \text{Eq. 2}$$

where: K is a constant (=2, for example) that is determined by a reduction ratio of reduction gearing 11, the radius of road wheels 3L, 3R, and the weight of vehicle.

In another embodiment of the present invention, it is determined that there is a need for a predetermined scheme, which is planned to prevent motor 4 from applying running resistance to rear road wheels 3L and 3R, when a GTM ratio Rhm $$\left(=\frac{Nh}{Nm}\right)$$

is less than a predetermined value.

In another embodiment of the present invention, it is determined that there is a need for a predetermined scheme, which is planned to prevent motor 4 from applying running resistance to rear road wheels 3L and 3R, when predicted future gear position a predetermined period of time after fails to remain at the first gear position.

Figure 8A:
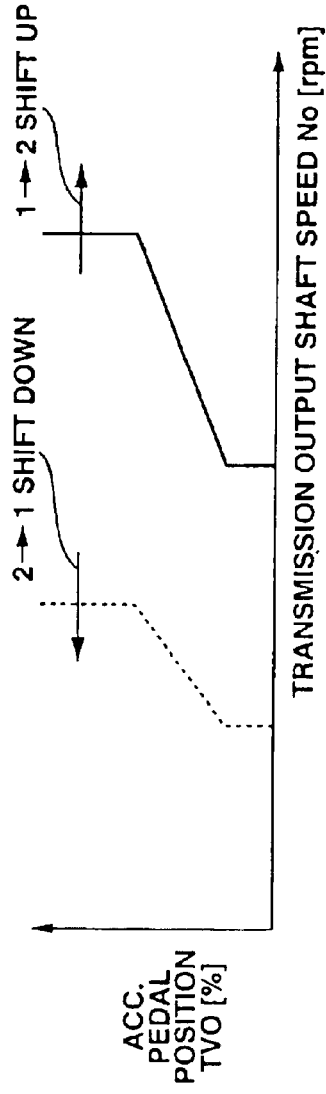
FIG. 8A is a shift schedule map A.
Figure 8B:
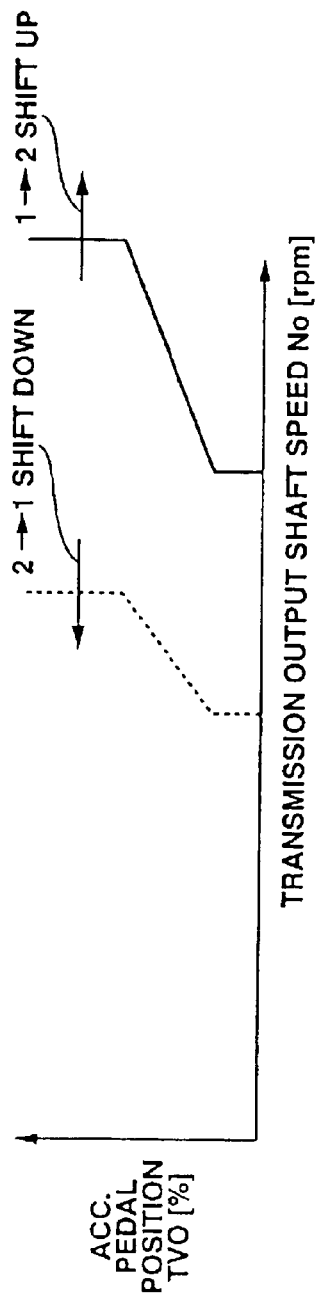
FIG. 8B is a shift schedule map B.

In each of the embodiments of the present invention, the predetermined scheme may include a modification of shift schedule in the automatic transmission by replacing an ordinary shift schedule map A in FIG. 8A with another shift schedule map B in FIG. 8B and a release of lock-up mode of the torque converter. Alternatively, the predetermined scheme may include a shift-down in the automatic transmission. Alternatively, the predetermined scheme may include setting a lower limit to decreasing the speed (or gear) ratio due to shift-up in the automatic transmission. Alternatively, the predetermined scheme may include interrupting drive connection between motor 4 and rear road wheels 3L, 3R by disengaging clutch 12.

Figure 4:
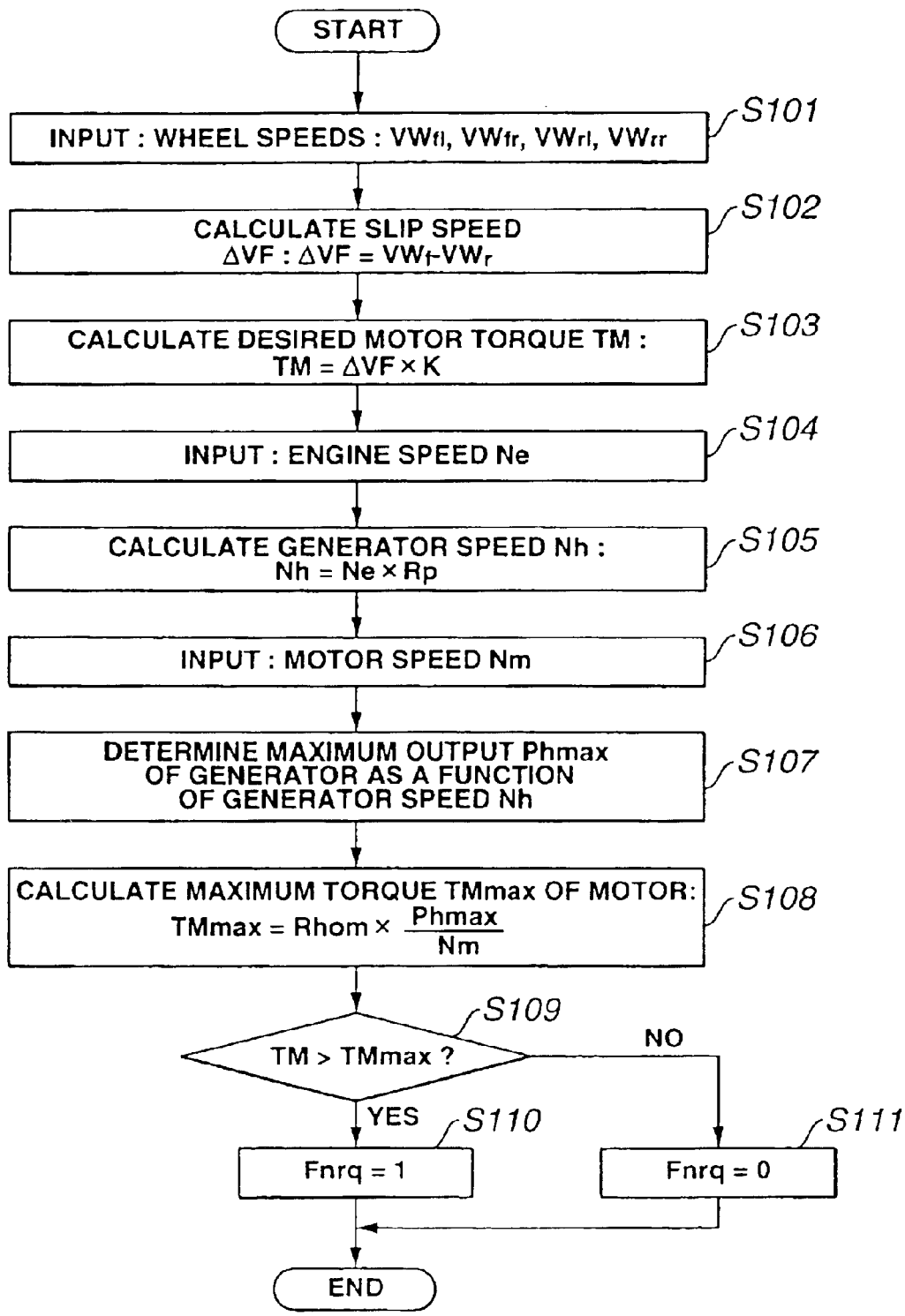
FIG. 4 is a flow diagram illustrating a control routine of software implementation of control logic for determining whether or not there is need for a predetermined scheme, which is planned to prevent an electric motor from applying running resistance to a set of rear wheels.

The flow diagram in FIG. 4 illustrates a control routine of the software implementation of control logic for determining that there is a need for a predetermined scheme, which is planned to prevent motor 4 from applying running resistance to rear road wheels 3L and 3R, when the maximum torque TMmax of motor 4 is exceeded by a desired value TM of motor torque. At input box S101, the controller 8 (see FIG. 1) inputs information of: wheel speeds VWfl, VWfr, VWrl and VWrr.

In box S102, the controller 8 calculates a slip speed ΔVF after calculating the average front wheel speed VWf and the average rear wheel speed VWr. The average front and rear wheel speeds VWf and VWr are expressed as:

$$VWf = \frac{VWfl + VWfr}{2} \quad \text{Eq. 3}$$

$$VWr = \frac{VWrl + VWrr}{2} \quad \text{Eq. 4}$$

The slip speed ΔVF is expressed as:

$$\Delta VF = VWf - VWr \quad \text{Eq. 5}$$

In the next box S103, the controller 8 calculates desired value TM of motor torque. The desired motor torque TM is expressed as the equation Eq. 2.

In box S104, the controller 8 inputs information of engine speed Ne from the output of engine speed sensor 21.

In box S105, the controller 8 calculates generator speed Nh of generator 7. The generator speed Nb is expressed as:

$$Nh = Ne \times Rp \qquad \text{Eq. 6}$$

In box S106, the controller 8 inputs information of motor speed Nm of motor 4 from the output of motor speed sensor 26 (see FIG. 2).

Figure 5:
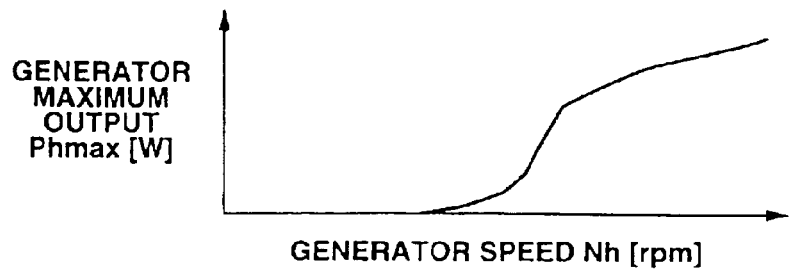
FIG. 5 is a graphical representation of a look-up table illustrating the relationship between the maximum output capability Phmax of a generator and the speed Nh of the generator.
Figure 6:
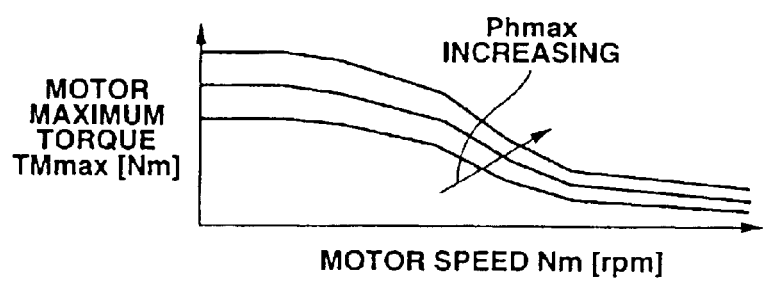
FIG. 6 is a graphical representation of a look-up map illustrating varying of the maximum torque TMmax of the electric motor with different values of motor speed Nm using the generator maximum output Phmax as a parameter.

In box S107, the controller 8 determines the maximum output Phmax of generator 7 as a function of generator speed Nh. The function is illustrated in FIG. 5. Specifically, the controller 8 looks into the look-up table illustrated in FIG. 5 indexed by generator speed Nh to determine the maximum output Phmax of generator 7. The maximum output Phmax indicates capability limit of generator 7 and it rises as generator speed Nh increases as illustrated in FIG. 5.

At box S108, the controller 8 determines the maximum torque TMmax of motor 4 by looking into look-up maps indexed by motor speed Nm and the maximum output Phmax or by calculating the equation Eq. 1.

In box S109, the controller 8 determines whether or not the desired motor torque TM exceeds the maximum motor torque TMmax. If this is the case (Yes), the controller 8 sets the flag Fnrq (Fnrq=1) at box S110. If this is not the case (NO), the controller 8 clears the flag Fnrq (Fnrq=0) at box S111.

From the flow diagram in FIG. 4, it will be appreciated that it is determined that there is the need (Fnrq=1) when the desired motor torque TM is not (or fails to be) exceeded (see boxes S109, S110). In general, it may be considered that the need arises when a motor torque threshold that corresponds to the desired motor torque TM fails to be exceeded. Specifically, when the motor torque threshold TM fails to be exceeded by the the maximum motor torque TMmax, it is determined that there is such need for a predetermined scheme, which is planned to prevent the motor 4 from applying running resistance to road wheels 3L and 3R.

Figure 7:
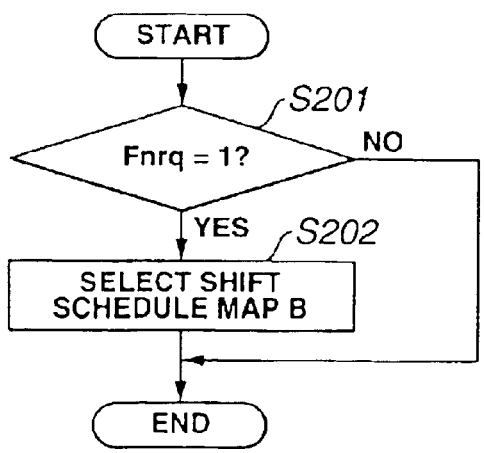
FIG. 7 is a flow diagram illustrating a control routine of software implementation of a portion of control logic for executing the predetermined scheme.

The flow diagram in FIG. 7 illustrates a control routine of software implementation of control logic for modifying a shift schedule in the automatic transmission.

In box S201, the controller 8 determines whether or not the flag Fnrq is set. If this is the case (YES), the controller 8 selects a shift schedule map B illustrated in FIG. 8B at box S202. If this is not the case (NOT), the routine ends so that an ordinary conventional shift schedule map A remains selected in usual manner. With reference to FIGS. 8A and 8B, the shift schedule map B is different from the shift schedule map A in that a 1–2 shift-up line has moved in a direction increasing the speed No of transmission output shaft.

Figure 9:
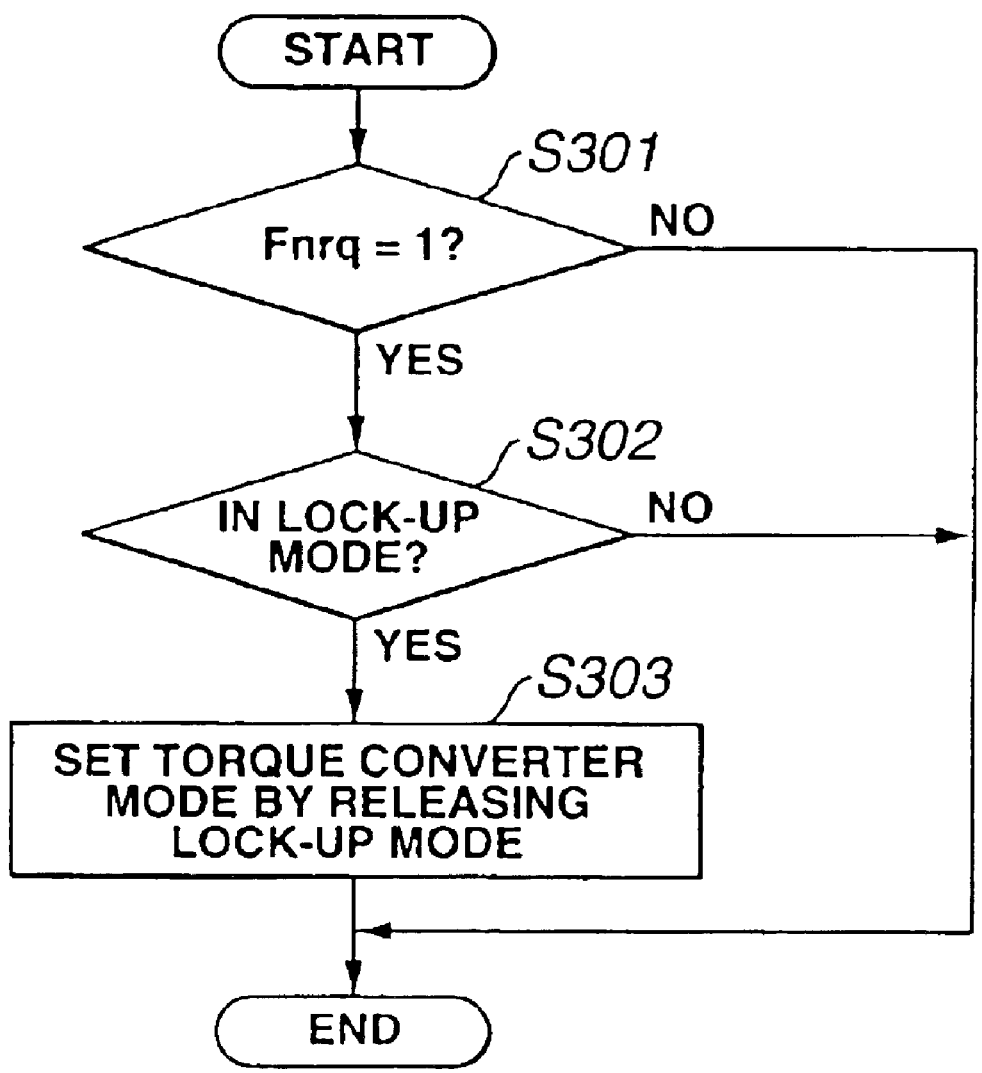
FIG. 9 is a flow diagram illustrating a control routine of software implementation of the remaining portion of the control logic for executing the predetermined scheme.

The flow diagram in FIG. 9 illustrates a control routine of software implementation of control logic for executing releasing of lock-up mode in the torque converter.

In box S301, the controller 8 determines whether or not the flag Fnrq is set. If this is the case (YES), the controller 8 determines, at box S302, whether or not the lock-up clutch is engaged so that the torque converter operates in lock-up mode. If this is not the case (NO), the routine ends.

If, at box S302, the controller 8 determines that the torque converter is in lock-up mode, the logic goes to box S303. If, at box S302, the controller 8 does not determine that the torque converter is in lock-up mode, the routine ends.

In box S303, the controller 8 sets the torque converter operable in torque converter mode by disengaging the lock-up clutch to release the lock-up mode.

Figure 10A:
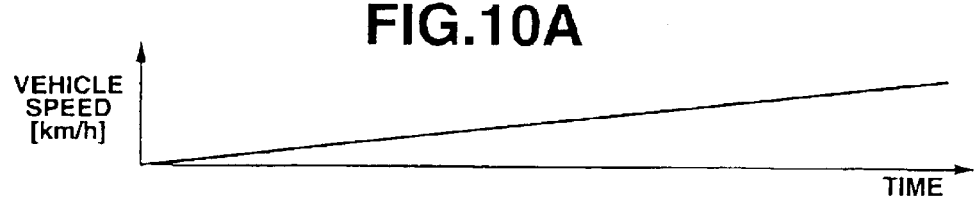
FIGS. 10A to 10H are timing charts illustrating operation of the invention.
Figure 10B:
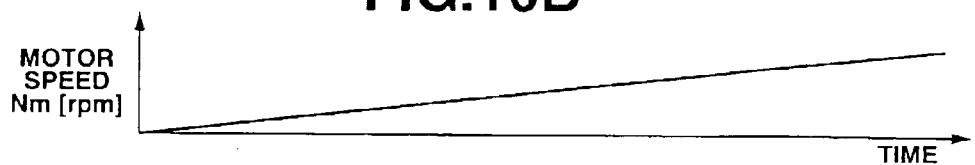
Figure 10C:
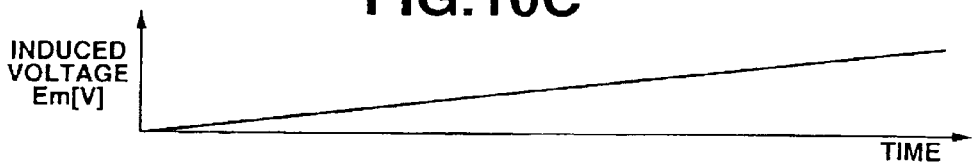
Figure 10D:
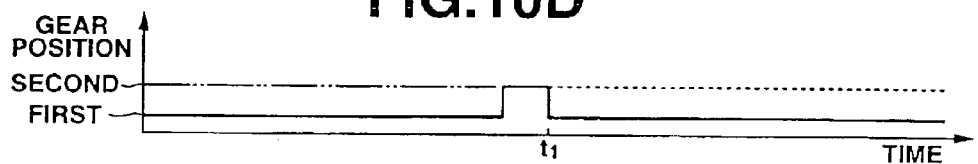
Figure 10E:
Figure 10F:
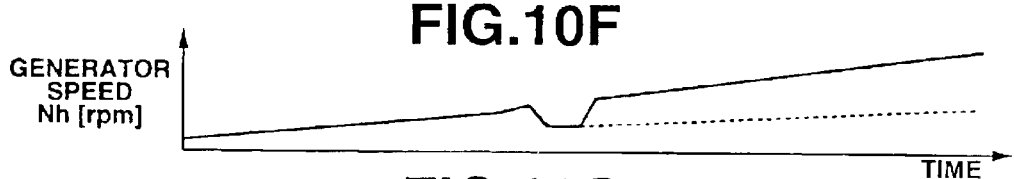
Figure 10G:
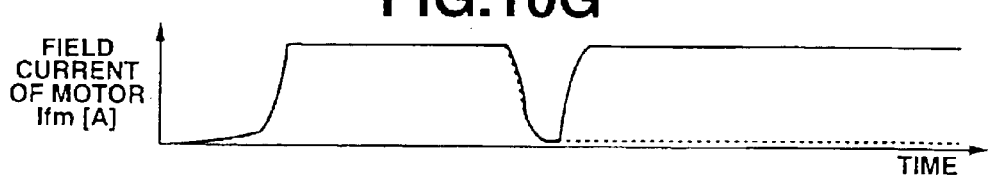
Figure 10H:
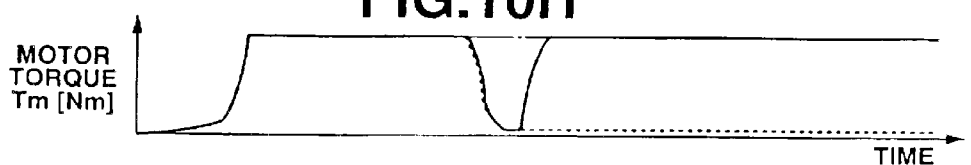

With reference to FIGS. 10A to 10H, it is now assumed that the vehicle is accelerated from a standstill (see FIG. 10A), causing slip speed ΔVF and hence desired motor torque TM to appear. Initially, the shift schedule map A illustrated in FIG. 8A is selected and the first gear position is established in the automatic transmission until a 1–2 shift-up occurs. Until the occurrence of 1–2 shift-up, the engine speed Ne and generator speed Nh increase as illustrated in FIGS. 10E and 10F. Such increase in generator speed Nh increases the generator maximum output Phmax to a sufficiently high level, so that the motor maximum torque TMmax remains greater than the desired motor torque TM. Under this condition, the control logic always goes from box S109 to box S111 (see FIG. 4).

Upon or immediately after the occurrence of 1–2 shift-up in accordance with the shift schedule map A, the engine speed Ne and hence generator speed Nh drop. Such drop in generator speed Nh causes a drop in the generator maximum output Phmax and hence the motor maximum torque TMmax. At the moment $t_1$, it is assumed that the desired motor torque TM exceeds the motor maximum torque TMmax. Immediately after this moment $t_1$, the control logic goes from box S109 to box S110 (see FIG. 4), so that the shift schedule map B illustrated in FIG. 8B is selected at box S202 (see FIG. 7). Such modification in shift schedule causes a shift-down to the first gear position because the 1–2 shift-up point of the shift schedule map B is on the higher vehicle side than the 1–2 shift-up point of the shift schedule map A. This shift-down operation causes a quick increase in generator speed Nh, allowing the motor maximum torque TMmax to exceed the desired motor torque TM again. In this manner, the supply of electric power to the motor 4 is held at a satisfactorily high level, preventing the motor 4 from applying running resistance to rear road wheels 3L and 3R.

The flow diagram in FIG. 11 illustrates a control routine of software implementation of control logic for making a forced down-shift to hold generator speed Nh at satisfactorily high level to prevent electric motor 4 from applying running resistance to rear road wheels 3L and 3R.

At box S401, the controller 8 determines whether or not the flag Fnrq is set (Fnrq=1). If this is the case (YES), the logic goes to box S402. If this is not the case (NO), the routine ends.

At box S402, the controller 8 inputs information of: a current gear position Gp of the automatic transmission, a gear or speed ratio Rgp for the current gear position Gp, a gear or speed ratio Rgpd for a new gear position to which a shift-down is demanded, and a transmission output shaft speed No.

In box S403A, the controller 8 determines a current value Nin of transmission input shaft speed Ni by calculating the following formula:

$$Nin = Rgp \times No \qquad \text{Eq. 7}$$

In the next box S403B, the controller 8 determines a future value Nin+1 of transmission input shaft speed Ni by calculating the following formula:

$$Nin+1 = Rgpd \times No \qquad \text{Eq. 8}$$

where: the future value Nin+1 is a value of transmission input shaft speed Ni to be accomplished by the shift-down.

In box S404, the controller 8 determines whether or not the current value Nin of transmission input shaft speed Ni is greater than a predetermined speed of, for example, 6,000 rpm. If this is the case (YES), the routine ends. If this is not the case (NO), the logic goes to the next box S405.

In box S405, the controller 8 determines whether or not the future value Nin+1 of transmission input shaft speed Ni is greater than a predetermined speed of, for example, 6,000 rpm. If this is the case (YES), the logic goes to box S416. If this is not the case (NO), the logic goes to box S406.

In box S406, the controller 8 inputs information of accelerator pedal position TVO of the accelerator pedal 17 from accelerator pedal sensor 60 (see FIG. 2).

In box S407A, the controller 8 inputs information of a current value Nen of engine speed Ne from engine speed sensor 21 (see FIGS. 1 and 2). In box S407B, the controller 8 predicts a future value Nen+1 of engine speed Ne to be accomplished after the demanded shift-down. This prediction comes from the current value Nen and the accelerator pedal position TVO.

Figure 12:
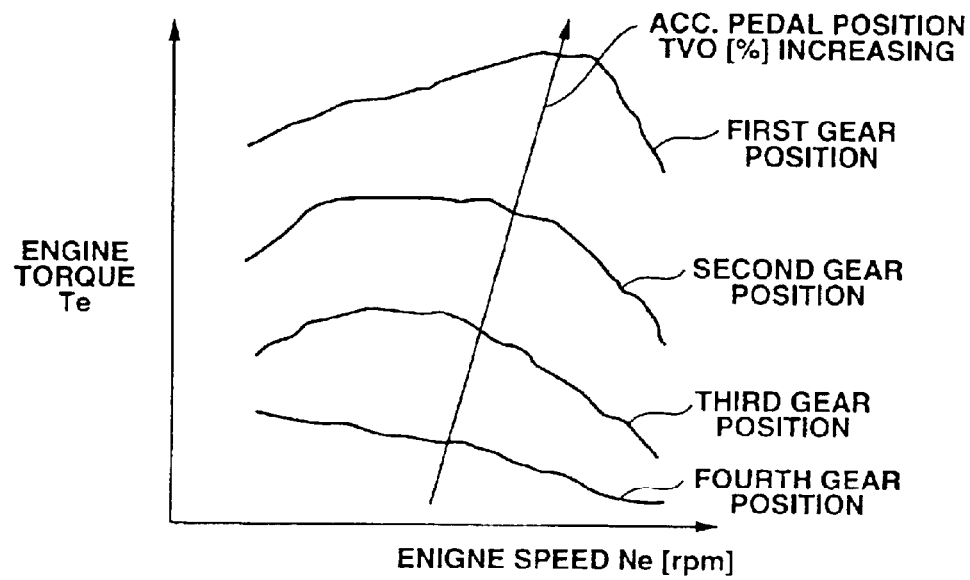
FIG. 12 is a graphical representation of a look-up map illustrating varying of engine torque Te with different values of engine speed Ne using accelerator pedal position TVO as a parameter.

In box S408, the controller 8 determines a current value of Ten of engine torque Te as a function of the current value Nen and the accelerator pedal position TVO by retrieving a look-up map illustrated in FIG. 12.

Figure 13:
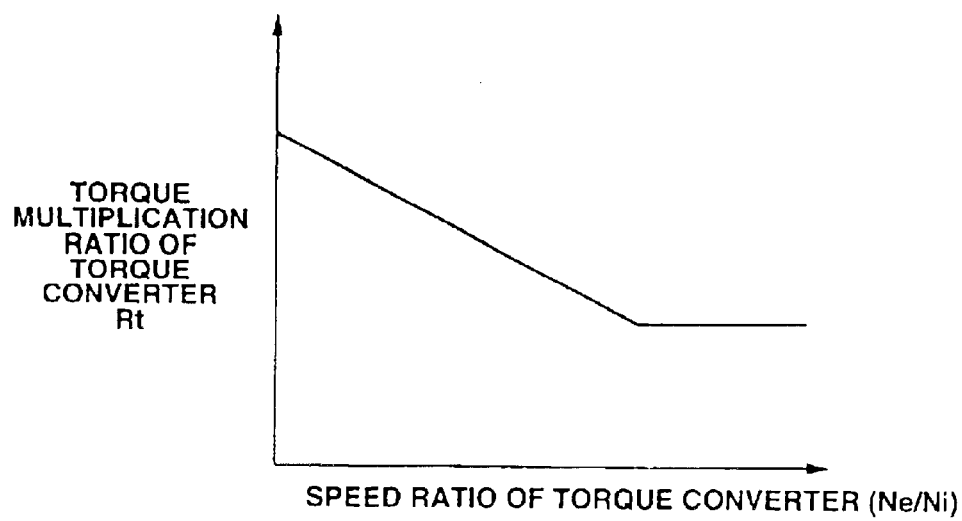
FIG. 13 is a graphical representation of a look-up table illustrating varying of torque multiplication ratio Rt of a torque converter with different values of speed ratio (Ne/Ni) of the torque converter.

In box S409, the controller 8 determines a current value Rtn of torque multiplication ratio Rt of torque converter by retrieving a look-up table illustrated in FIG. 13 using a current value Nen/Nin of speed ratio of torque converter.

In box S410, the controller 8 predicts a future value Ted of engine torque Te, which is to be accomplished after the demanded shift-down, as a function of the future value Nen+1 and the accelerator pedal position TVO by retrieving the look-up map in FIG. 12.

In box S411, the controller 8 determines a future value Rtn of torque multiplication ratio Rt of torque converter, which is to be accomplished after the demanded shift-down, by retrieving the look-up table in FIG. 13 using a future value Nen+1/Nin+1 of speed ratio of torque converter.

In box S412, the controller 8 determines a current value DTn of driving torque DT by calculating the following formula:

$$DTn = Ten \times Rgp \times Rtn \quad \text{Eq. 9}$$

In box S413, the controller 8 predicts a future value DTnd of driving torque DT, which is to be accomplished after the demanded shift-down, by calculating the following formula:

$$DTnd = Ten+1 \times Rgpd \times Rtd \quad \text{Eq. 10}$$

In the next box S414, the controller 8 determines whether or not the future value DTnd is greater than the current value DTn. If this is the case (YES), the controller 8 outputs a shift-down command at box S415. If this is not the case (NO), the controller 8 keeps the current gear position Gp. More specifically, the controller 8 allows the automatic transmission to shift in gear ratio in accordance with the shift schedule map A.

According to the predetermined scheme, since logic goes from box S405 to box S416, the engine is prevented from overrunning. A shift-down in the automatic transmission takes places only when an increase in driving torque TD is confirmed at box S414, causing an increase in generator speed Nh. This increase in generator speed Nh allows the motor maximum torque TMmax to exceed the desired motor torque TM again. In this manner, the supply of electric power to the motor 4 is held at a satisfactorily high level, preventing the motor 4 from applying running resistance to rear road wheels 3L and 3R.

Figure 14:
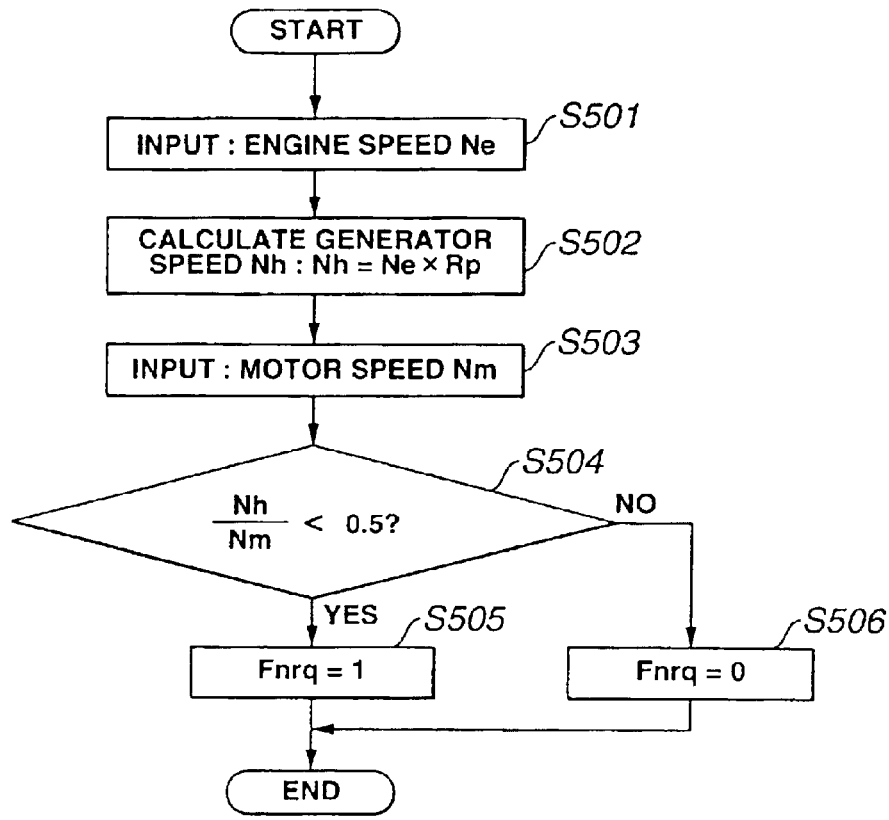
FIG. 14 is a flow diagram illustrating a control routine of another software implementation of control logic for determining whether or not there is a need for a predetermined scheme, which is planned to prevent an electric motor from applying running resistance to a set of rear road wheels.

The flow diagram in FIG. 14 illustrates a control routine of another software implementation of control logic for determining that there is a need for a predetermined scheme, which is planned to prevent motor 4 from applying running resistance to rear road wheels 3L and 3R when a GTM ratio $$\left( = \frac{Nh}{Nm} \right)$$

is less than a predetermined value of 0.5. The equation Eq. 1 indicates that the motor maximum torque TMmax is proportional to the ratio $$\frac{Phmax}{Nm},$$

Figure 15:
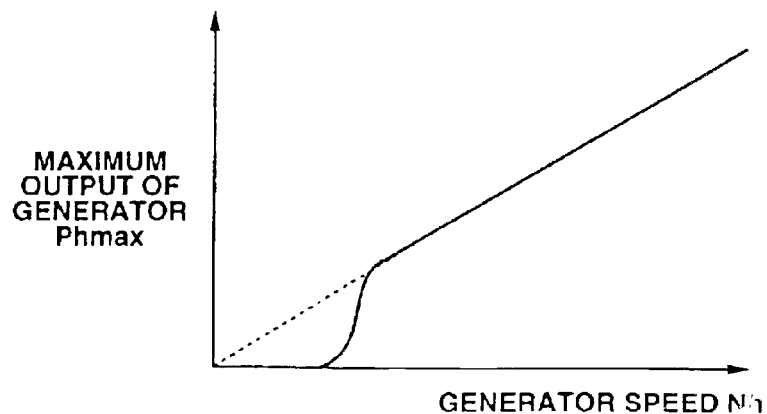
FIG. 15 is a graphical representation illustrating varying of the maximum output Phmax of generator with different values of speed Nh of the generator.

This ratio corresponds to the GTM ratio $$\frac{Nh}{Nm}$$

because the generator maximum output Phmax increases as the generator speed Nh increases as shown in FIG. 15.

In FIG. 14, at box S501, the controller 8 inputs information of engine speed Ne from engine speed sensor 21.

In box S502, the controller 8 calculates generator speed Nh using the equation Eq. 6.

In box S503, the controller 8 inputs information of motor speed Nm from motor speed sensor 26 (see FIG. 2).

In box S504, the controller 8 determines whether or not GTM ratio $$\frac{Nh}{Nm}$$

is less than the predetermined value of 0.5. If this is the case (YES), the controller 8 sets the flag Fnrq (Fnrq=1) at box S505. If this is not the case (NO), the controller 8 clears the flag Fnrq (Fnrq=0).

Figure 16:
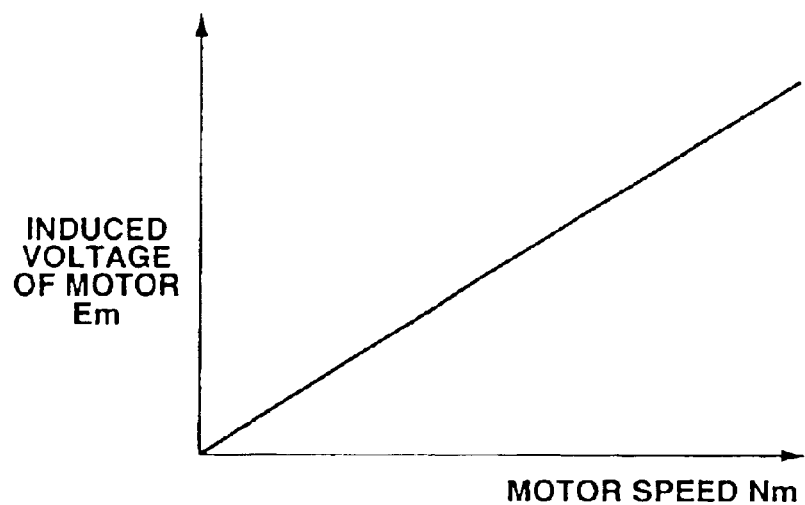
FIG. 16 is a graphical representation illustrating varying of induced voltage Em of electric motor with different values of motor speed Nm.
Figure 17:
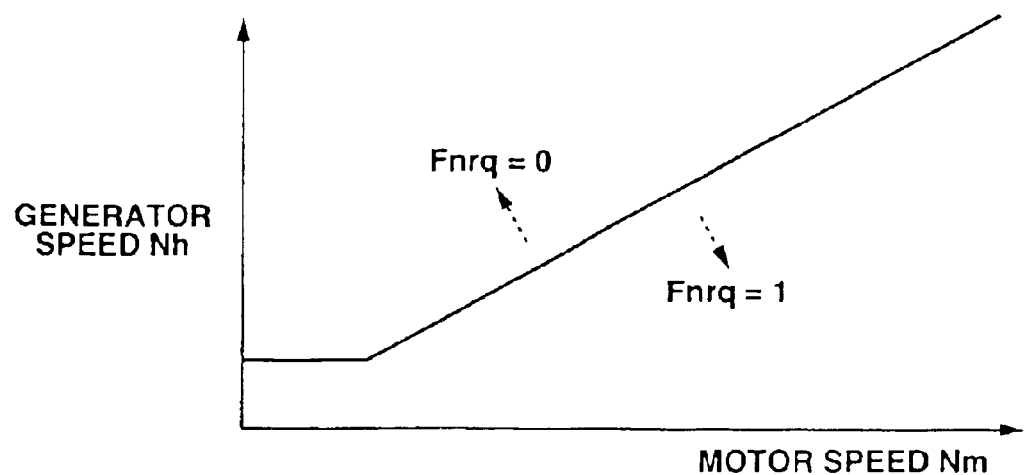
FIG. 17 is a graphical representation illustrating varying of the lower limit of generator speed Nh with different values of motor speed Nm.

As shown in FIG. 15, the generator maximum output Phmax is almost zero when the generator speed Nh is very low although it increases as the generator speed Nh increases further. As shown in FIG. 16, the motor induction voltage Em increases as motor speed Nm increases. With reference to FIG. 17, the fully drawn line illustrates the required minimum of generator speed Nh for motor 4 to drive rear road wheels 3L and 3R without applying running resistance thereto. Accordingly, the flag Fnrq is set within a lower region below this line, while the flag Fnrq is cleared within an upper region above this line.

Figure 18:
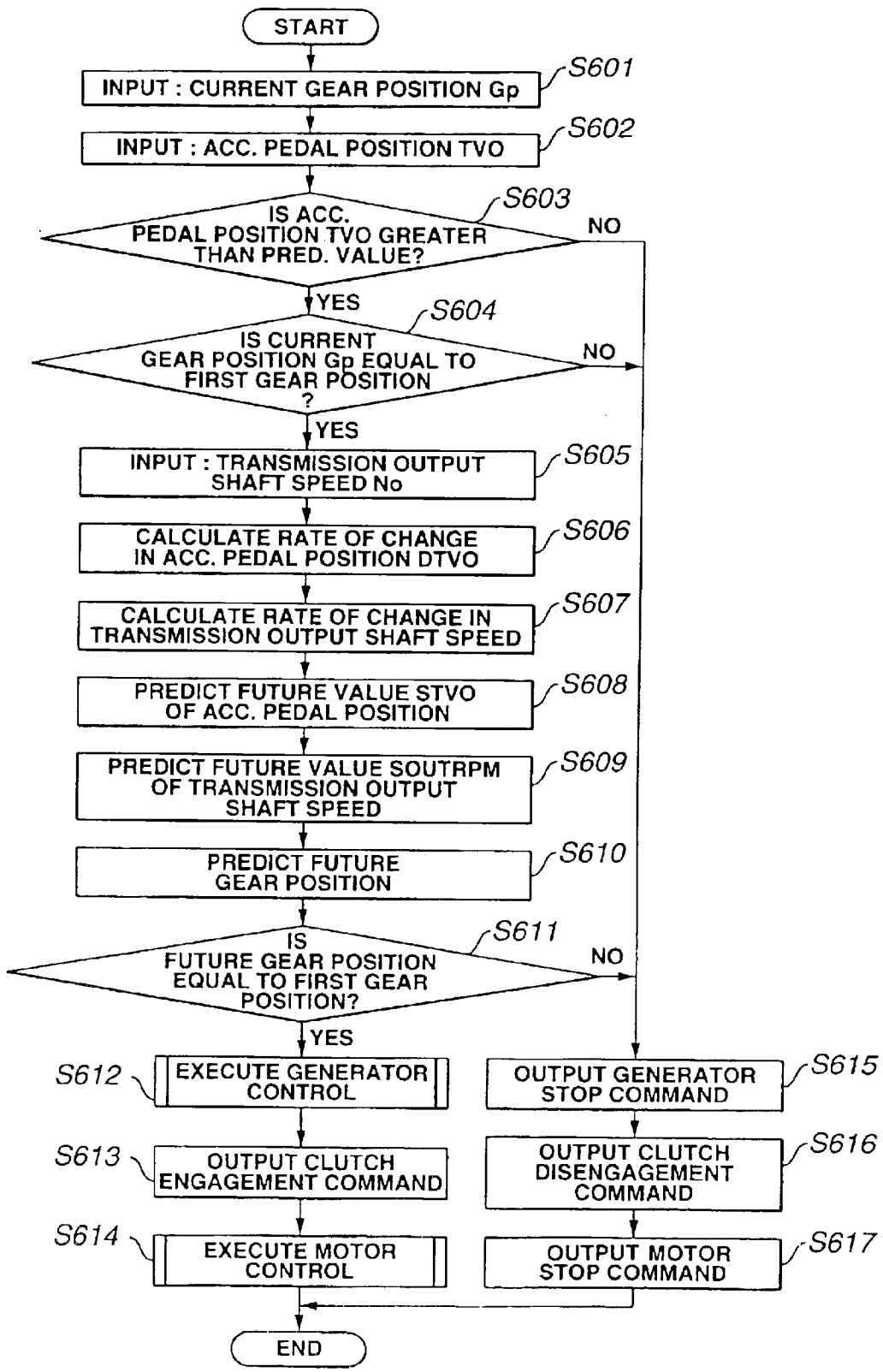
FIG. 18 is a flow diagram illustrating a control routine of software implementation of control logic for determining whether or not there is a need for a predetermined scheme, which is planned to prevent an electric motor from applying running resistance to a set of rear road wheels, and control logic for executing the predetermined scheme in response to the need.

The flow diagram in FIG. 18 illustrates a control routine of software implementation of control logic for determining that there is a need for a predetermined scheme, which is planned to prevent motor 4 from applying running resistance to rear road wheels 3L and 3R, when a predicted future gear position a predetermined period of time (200 milliseconds, in the embodiment) after fails to remain at the first gear position.

At box S601, the controller 8 inputs information of current gear position Gp. At box S602, the controller 8 inputs information of current accelerator pedal position TVO.

In box S603, the controller 8 determines whether or not the current accelerator pedal position TVO is greater than a predetermined value. If this is the case (YES), the logic goes to box S604. If this is not the case (NO), the logic goes to box S615.

In the next box S604, the controller 8 determines whether or not the current gear position Gp is equal to the first gear position. If this is the case (YES), the logic goes to box S605. If this is not the case (NO), the logic goes to box S615.

In the next box S605, the controller 8 inputs information of current transmission output shaft speed No from speed sensor 20.

In box S606, the controller 8 calculates the rate of change in accelerator pedal position DTVO. In this example, an old value of TVO that was stored 40 milliseconds ago is subtracted from the current value of TVO to give a difference. Dividing this difference by 4 (four) provides a change in accelerator pedal position TVO for a predetermined interval of 10 milliseconds.

In box S607, the controller 8 calculates the rate of change in transmission output shaft speed No. In this example, an old value of No that was stored 40 milliseconds ago is subtracted from the current value of No to give a difference. Dividing this difference by 4 (four) provides a change in transmission output shaft speed No for a predetermined interval of 10 milliseconds.

In box S608, the controller 8 predicts a future value STVO of accelerator pedal position TVO. In this example, adding the current value of TVO to the product of the rate of change in accelerator pedal position DTVO and 20 (twenty) gives the future value STVO to be accomplished 200 milliseconds after.

In box S609, the controller 8 predicts a future value SOUTRPM of transmission output shaft speed No. In this example, adding the current value of No to the product of the rate of change in transmission output shaft speed and 20 (twenty) gives the future value SOUTRPM to be accomplished 200 milliseconds after.

Figure 19:
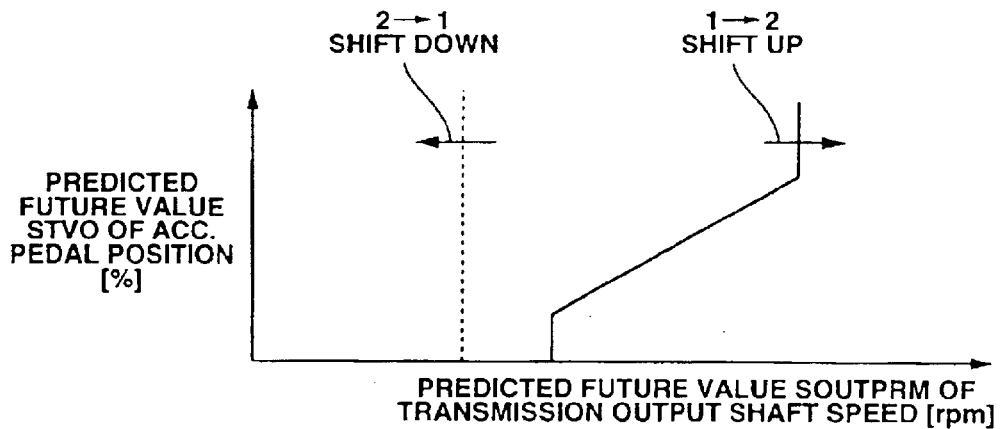
FIG. 19 is a shift schedule map.

In box S610, the controller 8 predicts future gear position by looking into a shift schedule map illustrated in FIG. 19 using the future values STVO and SOUTRPM.

In box S611, the controller 8 determines whether or not the future gear position is equal to the first gear position. If this is the case (YES), the controller 8 determines that there is no need for the predetermined scheme, which is planned to prevent motor 4 from applying running resistance to rear road wheels 3L and 3R. Under this condition, the logic goes to box S612. If this is not the case (NO), the controller 8 determines that there is the need for the predetermined scheme. Under this condition, the logic goes to box S615.

Figure 20:
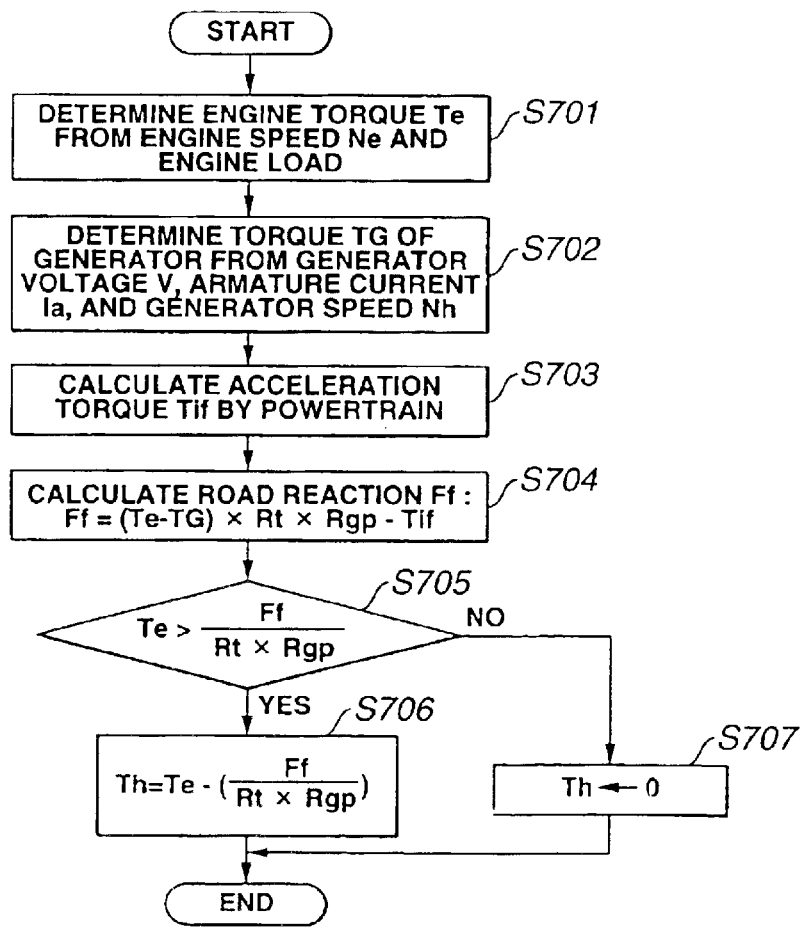
FIG. 20 is a flow diagram illustrating a control routine of software implementation of generator control wherein a desired value of load torque for generation Th is determined.

In box S612, the controller 8 executes generator control as illustrated in FIG. 20.

In box S613, the controller 8 outputs clutch engagement command for clutch 12.

Figure 21:
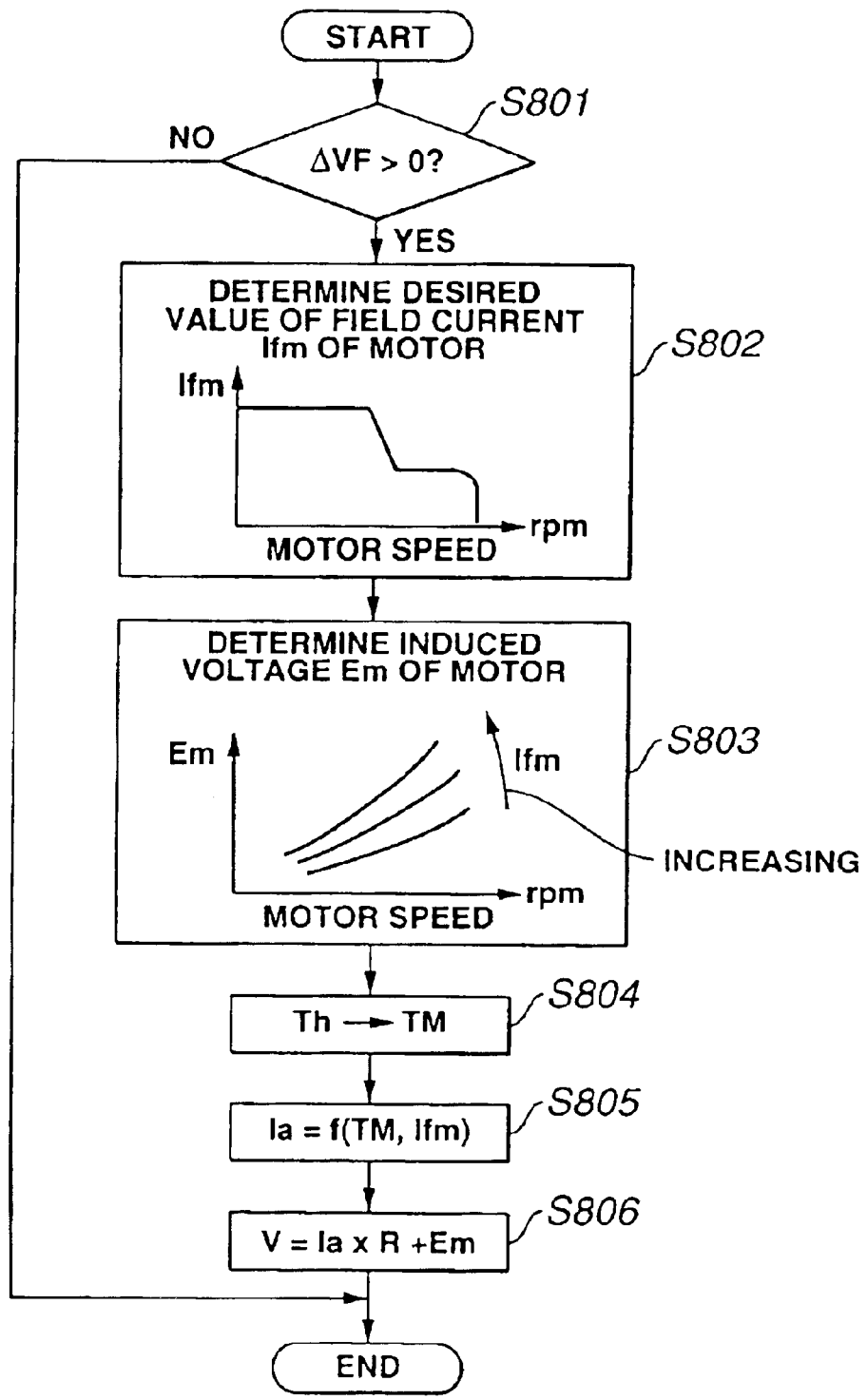
FIG. 21 is a flow diagram illustrating a control routine of software implementation of electric motor control wherein a desired value of voltage V of electric power output of generator is determined.

In box S614, the controller 8 executes motor control as illustrated in FIG. 21.

The predetermined scheme in this example includes interrupting drive connection between electric motor 4 and rear road wheels 3L and 3R by disengaging clutch 12. This scheme is initiated when the logic goes to box S615 from box S611.

In box S615, the controller 8 outputs generator stop command, suspending operation of generator 7 by interrupting the flow of field current Ifh through the generator.

In box S616, the controller 8 outputs clutch disengagement command, releasing engagement of clutch 12.

In box S617, the controller 8 outputs motor stop command, suspending operation of motor 4 by interrupting supply of current to the motor.

The flow diagram in FIG. 20 illustrates a control routine of software implementation of generator control.

In box S701, the controller 8 determines engine torque Te based on engine speed Ne from engine speed sensor 21 and opening angle of throttle valve 15 from throttle sensor 62 (see FIG. 2).

In box S702, the controller 8 determines a current value of torque TG applied to engine 2 by generator 7 for generation of electric power. The controller 8 determines the current value of torque TG based on output voltage V of generator 7, armature current Ia and speed Nh of generator 7.

In the next box S703, the controller 8 calculates acceleration torque by first powertrain Tif, which is expressed as:

$$Tif = [\text{Inertia of First Powertrain (including Gear Ratio)}] \times (\text{Angular Acceleration}) \quad \text{Eq. 11}$$

where: the angular acceleration is determined from wheels speeds of front road wheels 1L and 1R.

In box S704, the controller 8 calculates road reaction Ff at front road wheels 1L and 1R. The road reaction Ff is expressed as:

$$Ff = (Te - TG) \times Rt \times Rgp - Tif \quad \text{Eq. 12}$$

In this equation, TG=0 when generator 7 produces no electric power. The term (Rt×Rgp) is multiplied to Te to give driving torque applied to front road wheels 1L and 1R.

In box S705, the controller 8 determines whether or not the engine torque Te exceeds a predetermined level. The predetermined level is expressed by $$\frac{Ff}{Rt \times Rgp}.$$

If this is the case (YES), the logic goes to box S706. If this is not the case (NO), the logic goes to box S707.

In box S707, the controller 8 sets the desired value Th of load torque applied to engine 2 by generator 7 equal to 0 (zero).

In box S706, the controller determines the desired value Th of load torque, which is expressed as:

$$Th = Te - \left( \frac{Ff}{Rt \times Rgp} \right) \quad \text{Eq. 13}$$

The flow diagram in FIG. 21 illustrates a control routine of software implementation of motor control.

In box S801, the controller 8 determines whether or not the slip ΔVF occurs after comparing ΔVF to 0 (zero). If this is the case (YES), the logic goes to box S802. If this is not the case (NO), the routine ends.

In box S802, the controller 8 determines a desired value of field current Ifm by looking into a look-up table indexed by motor speed Nm. This look-up table contains data for two-level scheduling of field current Ifm against different motor speeds Nm. As illustrated by the fully drawn line in box S802, field current Ifm is kept at a first level when motor 4 operates at motor speeds lower than a predetermined speed. When this predetermined speed is exceeded, field current Ifm drops to a second level. This drop in field current Ifm provides a good solution to insufficient torque output of motor 4 at high motor speeds. At high motor speeds, induced voltage Em of motor 4 elevates. This elevation obviates flow of current needed, in amount, for motor 4 to produce sufficiently high torque output desired at high motor speeds. The above mentioned drop in field current Ifm suppresses the elevation of induced voltage Em at high motor speeds, holding it low enough to ensure flow of current needed for motor 4 to produce sufficiently high torque output desired at high motor speeds.

After determining, in box S802, a desired value of field current Ifm, the logic goes to box S803.

In box S803, the controller 8 determines a value of induced voltage Em of motor 4 based on the desired value of field current Ifm and the current value of motor speed Nm by looking into the illustrated look-up map.

In the next box S804, the controller 8 determines a desired value TM of motor torque corresponding to or as a function of the desired value Th of load torque.

In box S805, the controller 8 determines a desired value of armature current Ia as a function of the desired value TM of motor torque and the desired value of field current Ifm.

In box S806, the controller 8 determines a desired value of output voltage V of generator 7, which is expressed as:

$$V = Ia \times R + Em \qquad \text{Eq. 14}$$

where: R is the resistance of cable 9 and the motor coil.

The desired value of output voltage V is applied to generator controller 8A (see FIG. 3).

With reference back to FIG. 18, the predetermined value used in box S603 is 4% in this embodiment. This means that clutch 12 disengages to interrupt drive connection between electric motor 4 and rear road wheels 3L and 3R when the accelerator pedal position TVO is less than 4%. The provision of box S604 is to keep clutch 12 disengaged when the selected gear position is second or third or fourth gear position. Accordingly, drive connection between motor 4 and rear road wheels 3L and 3R is interrupted when sufficiently high engine Ne and hence generator speed Nh cannot be expected during vehicle operation at the first gear position with accelerator pedal position less than 4%.

In box S610, a future gear position to be accomplished 200 milliseconds after is predicted. In the next box S611, the predicted future gear position is evaluated. Accordingly, the drive connection between motor 4 and rear road wheels 3L and 3R is interrupted immediately before occurrence of a shift-up from the fist gear position to the second gear position.

In the embodiment illustrated in FIGS. 18 to 21, motor 12 is prevented from applying running resistance to rear road wheels 3L and 3R by interrupting drive connection between motor 2 and rear road wheels 3L and 3R when generation of sufficiently high electric power is not expected.

Figure 22:
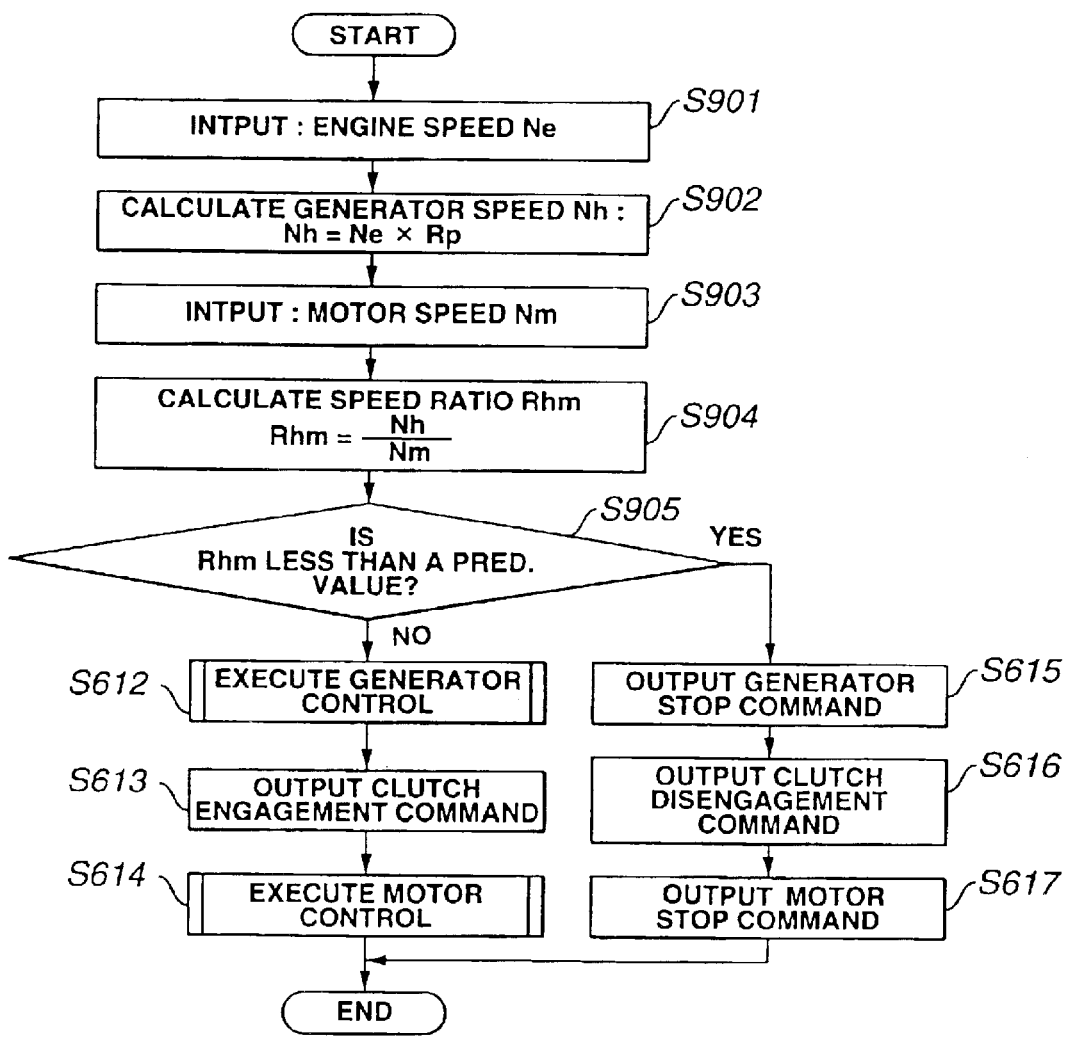
FIG. 22 is a flow diagram illustrating a control routine of another software implementation of control logic for determining whether or not there is a need for a predetermined scheme, which is planned to prevent an electric motor from applying running resistance to a set of rear road wheels, and control logic for executing the predetermined scheme in response to the need.

The flow diagram in FIG. 22 illustrates a control routine of another software implementation of control logic for determining that there is a need for interrupting drive connection between motor 4 and rear road wheels 3L and 3R when the GTM ratio $$\left( Rhm = \frac{Nh}{Nm} \right)$$

is less that a predetermined value.

With reference also to FIG. 14, the flow diagram in FIG. 22 includes boxes S901 to S905 that are similar to boxes S501 to S504 of the flow diagram in FIG. 14. With reference also to FIG. 18, the flow diagram in FIG. 22 includes boxes S612 to S617 that correspond exactly to boxes S612 to S617 of the flow diagram in FIG. 18.

Comparing the flow diagram in FIG. 22 to the flow diagram in FIG. 14, the flow diagram in FIG. 22 is different from the flow diagram in FIG. 14 in that the boxes S612 to S617 are added to execute interruption of drive connection between motor 4 and rear road wheels 3L and 3R when the GTM ratio Rhm is less than the predetermined value. The boxes S901 to S903 correspond exactly to the boxes S501 to S503. Besides, the boxes S904 and S905 are in good analogous to the box S504.

Comparing the flow diagram in FIG. 22 to the flow diagram in FIG. 18, the flow diagram in FIG. 22 is different from the flow diagram in FIG. 18 in that the boxes S901 to S905 are provided instead of the boxes S601 to S611.

In FIG. 22, at box S901, the controller 8 inputs information of engine speed Ne from engine speed sensor 21.

In box S902, the controller 6 calculates generator speed Nh using the equation Eq. 6.

In box S903, the controller 8 inputs information of motor speed Nm from motor speed sensor 26 (see FIG. 2).

In box S904, the controller 8 calculates the GTM ratio Rhm by dividing Nh by Nm.

In box S905, the controller 8 determines whether or not GTM ratio Rhm is less than the predetermined value of, for example, 0.5. If this is the case (YES), the logic goes to box S615 and then to boxes S616 and S617, disengaging clutch 12. If this is not the case (NO), the logic goes to S612 and then to boxes S613 and S614.

Figure 23:
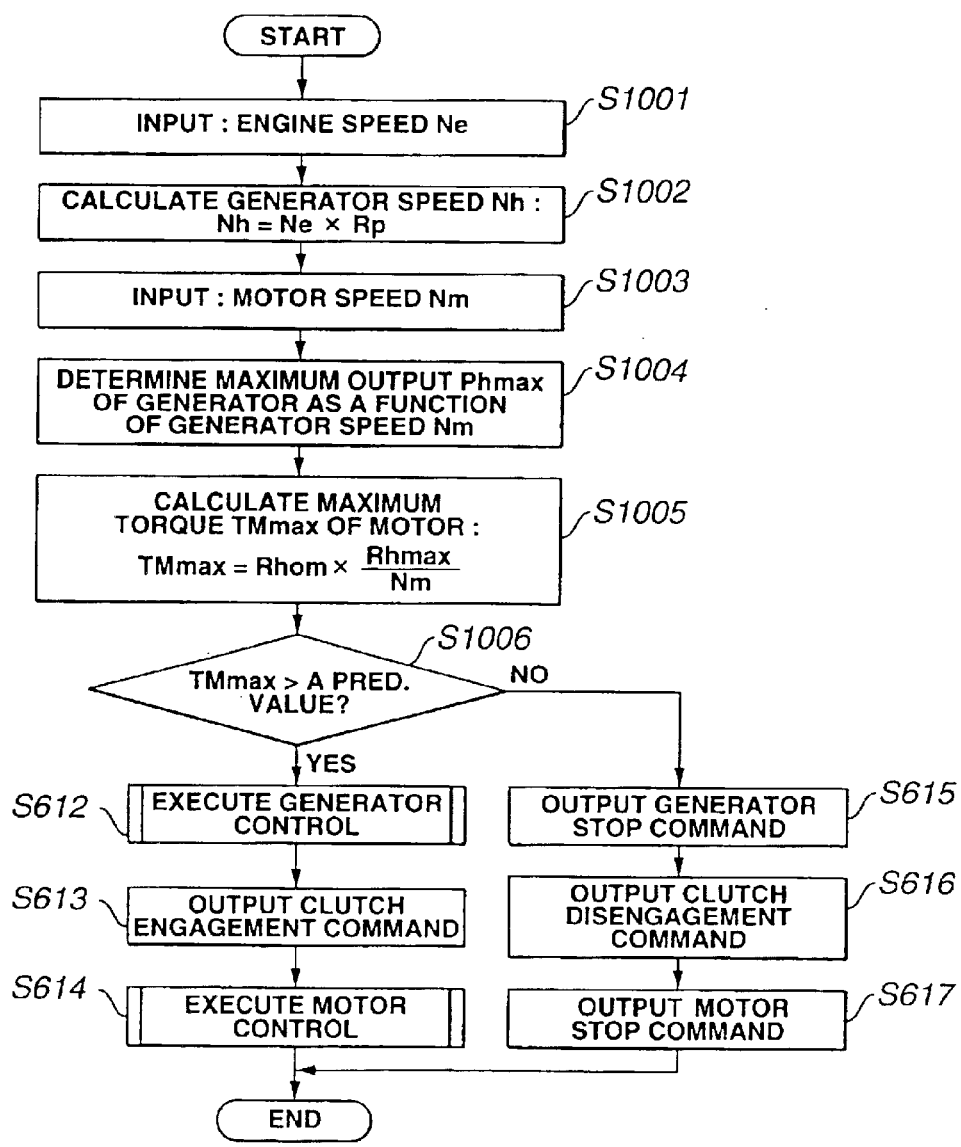
FIG. 23 is a flow diagram illustrating a control routine of another software implementation of control logic for determining whether or not there is a need for a predetermined scheme, which is planned to prevent an electric motor from applying running resistance to a set of rear road wheels, and control logic for executing the predetermined scheme in response to the need.

The flow diagram in FIG. 23 illustrates a control routine of another software implementation of control logic for determining that there is a need for interrupting drive connection between motor 4 and rear road wheels 3L and 3R when the maximum motor torque TMmax falls to exceed a predetermined value.

With reference also to FIG. 4, the flow diagram in FIG. 23 includes boxes S1001 to S1006 that are similar to boxes S101 to S109 of the flow diagram in FIG. 4. With reference also to FIG. 22, the flow diagram In FIG. 23 includes boxes S612 to S617 that correspond exactly to boxes S612 to S617 of the flow diagram in FIG. 22.

Comparing the flow diagram in FIG. 23 to the flow diagram in FIG. 22, the flow diagram in FIG. 23 is different from the flow diagram in FIG. 22 in that the boxes S1001 to S1005 are provided instead of the boxes S901 to S905 to execute interruption of drive connection between motor 4 and rear road wheels 3L and 3R when the TMmax fails to exceed the predetermined value.

In FIG. 23, at box S1001, the controller 8 inputs information of engine speed Ne from engine speed sensor 21.

In box S1002, the controller 8 calculates generator speed Nh using the equation Eq. 6.

In box S1003, the controller 8 inputs information of motor speed Nm from motor speed sensor 26 (see FIG. 2).

In box S1004, the controller 8 determines the maximum output Phmax of generator 7 as a function of generator speed Nh. The function is illustrated in FIG. 5.

In box S1005, the controller 8 determines the maximum torque TMmax of motor 4 by looking into look-up maps indexed by motor speed Nm and the maximum output Phmax or by calculating the equation Eq. 1.

In box S1006, the controller 8 determines whether or not the maximum torque TMmax exceeds a predetermined value of, for example, 1 Nm. If TMmax fails to exceed the predetermined value (NO), the logic goes to box S615 and then to boxes S616 and S617, disengaging clutch 12. If TMmax exceeds the predetermined value (YES) the logic goes to S612 and then to boxes S613 and S614.

From the flow diagram in FIG. 23, it will be appreciated that it is determined that there is the need when the predetermined value is not (or fails to be) exceeded (see boxes S1006, S615 to S617). In general, it may be considered that the need arises when a motor torque threshold that corresponds to this predetermined value falls to be exceeded. Specifically, when the motor torque threshold fails to be exceeded by the the maximum motor torque TMmax, it is determined that there is such need for a predetermined scheme, which is planned to prevent the motor 4 from applying running resistance to road wheels 3L and 3R.

Figure 24:
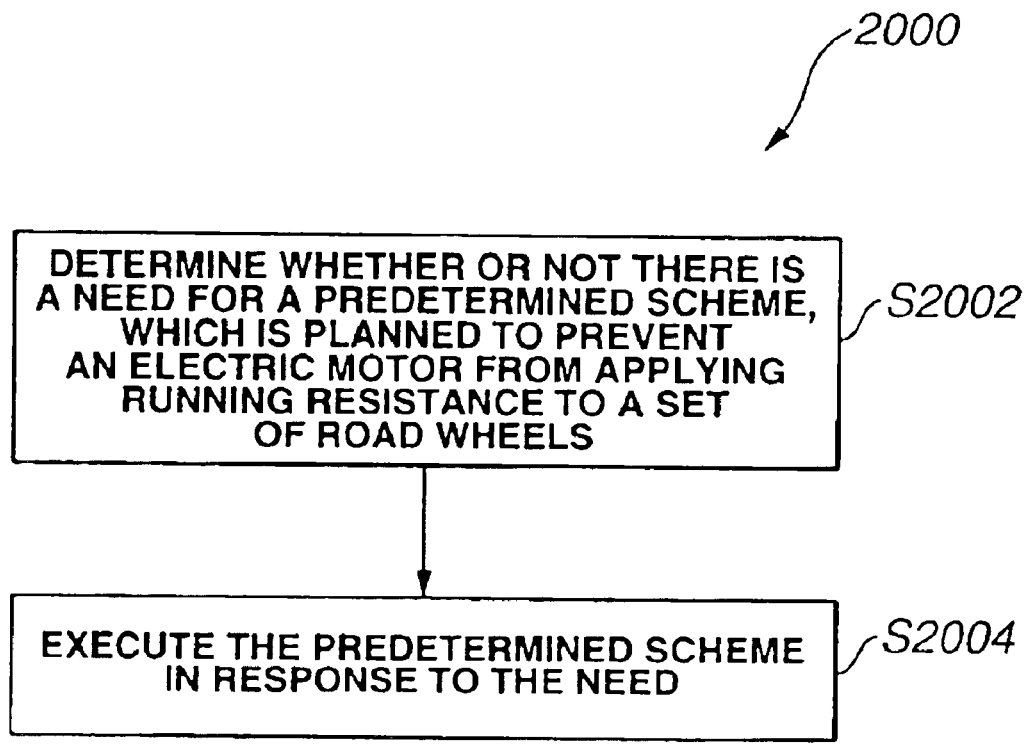
FIG. 24 is a flow diagram illustrating the present invention.

With reference now to FIG. 24, a control method of the present invention for a vehicle with a first powertrain and a second powertrain is generally indicated at 2000. At block S2002, it is determined whether or not there is a need for a predetermined scheme, which is planned to prevent an electric motor 4 from applying running resistance to a set of road wheels 3L and 3R. At box S2004, the predetermined scheme is executed in response to the need.

In each of the embodiments of the present invention, various examples of the predetermined scheme have been described. One example includes a modification of shift schedule in the automatic transmission and a release of lock-up mode of the torque converter. Another example includes a shift-down in the automatic transmission. Another example includes setting a lower limit to decreasing the speed (or gear) ratio due to shift-up in the automatic transmission. Another example includes interrupting drive connection between motor 4 and rear road wheels 3L, 3R by disengaging clutch 12.

Other example includes regulating field current passing through the motor 4 in a manner to prevent the motor 4 from applying running resistance to rear road wheels 3L and 3R whenever a need arises for a predetermined scheme, which is planned to prevent motor 4 from applying running resistance to rear road wheels 3L and 3R.

From the preceding description, it will be appreciated that preventing an electric motor 4 from applying running resistance to a set of road wheels 3L and 3R provides enhanced efficiency and improved fuel economy.

While the present invention has been particularly described, in conjunction with exemplary implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. P2001-329887, filed Oct. 26, 2001, the disclosure of which is hereby incorporated by reference in its entirety.

What is claimed is:

1. A control system for a vehicle with a first powertrain and a second powertrain, the first powertrain including an engine and being coupled with a first set of road wheels, the second powertrain including an electric motor and being coupled with a second set of road wheels, the vehicle including a generator coupled with the engine, the generator being provided as a source of electric power for the electric motor, the control system comprising:

control logic for determining whether or not there is a need for a predetermined scheme, which is planned to prevent the motor from applying running resistance to the second set of road wheels; and control logic for executing the predetermined scheme in response to the need, wherein the first powertrain includes an automatic transmission that has various speed ratios of input to output shafts thereof, and wherein the predetermined scheme includes:

controlling the automatic transmission to affect engine speed and hence generator speed in such a manner for the generator as to produce electric power high enough for the motor to output torque that overcomes road load from the second set of road wheels.

2. The control system as claimed in claim 1, wherein the controlling the automatic transmission includes a shift-down in the automatic transmission.

3. The control system as claimed in claim 1, wherein controlling the automatic transmission includes modifying a shift schedule in the automatic transmission such that the modified shift schedule provides expanded operating range of relatively great speed ratios by compressing operating range of relatively small speed ratios.

4. The control system as claimed in claim 1, wherein controlling the automatic transmission includes:

setting a lower limit to decreasing the speed ratio due to shift-up in the automatic transmission.

5. A control system for a vehicle with a first powertrain and a second powertrain, the first powertrain including an engine and being coupled with a first set of road wheels, the second powertrain including an electric motor and being coupled with a second set of road wheels, the vehicle including a generator coupled with the engine, the generator being provided as a source of electric power for the electric motor, the control system comprising:

control logic for determining whether or not there is a need for a predetermined scheme, which is planned to prevent the motor from applying running resistance to the second set of road wheels; and control logic for executing the predetermined scheme in response to the need, wherein the first power train includes an automatic transmission that has various speed ratios of input to output shafts thereof, and wherein the control logic for determining whether or not there is a need for a predetermined scheme determines that there is the need when the speed ratio in the automatic transmission is not greater than a predetermined value.

6. A control system for a vehicle with a first powertrain and a second powertrain, the first powertrain including an engine and being coupled with a first set of road wheels, the second powertrain including an electric motor and being coupled with a second set of road wheels, the vehicle including a generator coupled with the engine, the generator being provided as a source of electric power for the electric motor, the control system comprising:

control logic for determining whether or not there is a need for a predetermined scheme, which is planned to prevent the motor from applying running resistance to the second set of road wheels; and control logic for executing the predetermined scheme in response to the need, wherein the first powertrain includes an automatic transmission that has various speed ratios of input to output shafts thereof, and wherein the control logic for determining whether or not there is a need for a predetermined scheme predicts a future speed ratio to be established in the automatic transmission and determines that there is the need when the predicted future speed ratio is not greater than a predetermined value.

7. The control system as claimed in claim 6, wherein the vehicle has an accelerator pedal, and wherein the predicted future speed ratio is determined based on rate of change in position of the accelerator pedal and rate of change in speed of the output shaft of the automatic transmission.

8. A control system for a vehicle with a first powertrain and a second powertrain, the first powertrain including an engine and being coupled with a first set of road wheels, the second powertrain including an electric motor and being coupled with a second set of road wheels, the vehicle including a generator coupled with the engine, the generator being provided as a source of electric power for the electric motor, the control system comprising:

control logic for determining whether or not there is a need for a predetermined scheme, which is planned to prevent the motor from applying running resistance to the second set of road wheels; and control logic for executing the predetermined scheme in response to the need, wherein the control logic for determining whether or not there is a need for a predetermined scheme calculates a generator-to-motor (GTM) ratio between speed of the generator and speed of motor and determines that there is the need when the calculated GTM ratio satisfies a predetermined relationship with a predetermined value.

9. A control system for a vehicle with a first powertrain and a second powertrain, the first powertrain including an engine and being coupled with a first set of road wheels, the second powertrain including an electric motor and being coupled with a second set of road wheels, the vehicle including a generator coupled with the engine, the generator being provided as a source of electric power for the electric motor, the control system comprising:

control logic for determining whether or not there is a need for a predetermined scheme, which is planned to prevent the motor from applying running resistance to the second set of road wheels; and control logic for executing the predetermined scheme in response to the need, wherein the control logic for determining whether or not there is a need for a predetermined scheme determines that there is the need when a predetermined motor torque threshold fails to be exceeded.

10. The control system as claimed in claim 9, wherein the predetermined motor torque threshold corresponds to a desired motor torque.

11. The control system as claimed in claim 9, wherein the predetermined control torque threshold is compared to a maximum torque of the motor that is determined based on speed of the motor and a maximum output of the generator that has been determined as a function of speed of the generator.

12. A control system for a vehicle with a first powertrain and a second powertrain, the first powertrain including an engine and being coupled with a first set of road wheels via an automatic transmission that has various speed ratios of input to output shafts thereof, the second powertrain including an electric motor and being coupled with a second set of road wheels, the vehicle including a generator coupled with the engine, the generator being provided as a source of electric power for the electric motor, the control system comprising:

control logic for determining whether or not there is a need for a predetermined scheme, which is planned to prevent the motor from applying running resistance to the second set of road wheels; and control logic for executing the predetermined scheme in response to the need, wherein the predetermined scheme includes:

controlling the automatic transmission so as to affect engine speed and hence generator speed in such a manner for the generator as to produce electric power high enough for the motor to output torque that overcomes road load from the second set of road wheels.

13. A control method for a vehicle with a first powertrain and a second powertrain, the first powertrain including an engine and being coupled with a first set of road wheels, the second powertrain including an electric motor and being coupled with a second set of road wheels, the vehicle including a generator coupled with the engine, the generator being provided as a source of electric power for the electric motor, the control method comprising:

determining whether or not there is a need for a predetermined scheme, which is planned to prevent the motor from applying running resistance to the second set of road wheels; and executing the predetermined scheme in response to the need, wherein the first powertrain includes an automatic transmission that has a various speed ratios of input to output shafts thereof, and wherein the predetermined scheme includes:

controlling the automatic transmission so as to affect engine speed and hence generator speed in such a manner for the generator as to produce electric power high enough for the motor to output torque that overcomes road load from the second set of road wheels.

14. A vehicle, comprising:

a first set of road wheels;

a second set of road wheels;

a first powertrain including an engine and being coupled with the first set of road wheels;

a second powertrain including an electric motor and being coupled with the second set of road wheels;

a generator coupled with the engine, the generator being provided as a source of electric power for the electric motor;

a controller;

a computer readable storage medium having information stored thereon representing instructions executable by the controller to control the vehicle, wherein the controller is capable of controlling the generator, the first power train and second powertrain, wherein the computer readable storage medium includes instructions for the controller to:

determine whether or not there is a need for a predetermined scheme, which is planned to prevent the motor from applying running resistance to the second set of road wheels; and execute the predetermined scheme in response to the need, wherein the first powertrain includes an automatic transmission that has various speed ratios of input to output shafts thereof, and wherein the predetermined scheme includes:

controlling the automatic transmission so as to affect engine speed and hence generator speed in such a manner for the generator as to produce electric power high enough for the motor to output torque that overcomes road load from the second set of road wheels.

* * * * *